United States Patent
Sun et al.

(10) Patent No.: US 10,050,735 B2
(45) Date of Patent: Aug. 14, 2018

(54) WLAN AP-ASSISTED MULTI-WAY COEXISTENCE

(71) Applicant: QUALCOMM Incorporated, San Diego, CA (US)

(72) Inventors: Yanjun Sun, San Diego, CA (US); Rahul Malik, San Diego, CA (US); Peerapol Tinnakornsrisuphap, San Diego, CA (US); Menucher Behram Menuchehry, Carlsbad, CA (US); Olaf Josef Hirsch, Sunnyvale, CA (US); Eric Yuchuen Tsou, Palo Alto, CA (US)

(73) Assignee: QUALCOMM Incorporated, San Diego, CA (US)

( * ) Notice: Subject to any disclaimer, the term of this patent is extended or adjusted under 35 U.S.C. 154(b) by 123 days.

(21) Appl. No.: 14/987,588

(22) Filed: Jan. 4, 2016

(65) Prior Publication Data

US 2016/0198361 A1    Jul. 7, 2016

Related U.S. Application Data

(60) Provisional application No. 62/100,784, filed on Jan. 7, 2015.

(51) Int. Cl.
*H04W 28/04* (2009.01)
*H04J 11/00* (2006.01)
*H04W 84/12* (2009.01)

(52) U.S. Cl.
CPC ......... *H04J 11/0053* (2013.01); *H04W 84/12* (2013.01)

(58) Field of Classification Search
CPC .... H04W 84/12; H04W 28/04; H04J 11/0053
See application file for complete search history.

(56) References Cited

U.S. PATENT DOCUMENTS

| | | | |
|---|---|---|---|
| 2007/0036340 A1* | 2/2007 | Rhee ..................... | H04M 3/304 379/399.01 |
| 2008/0146227 A1* | 6/2008 | Wu ........................ | H04W 16/06 455/435.1 |
| 2011/0222524 A1 | 9/2011 | Thomson et al. | |
| 2012/0071101 A1 | 3/2012 | Wentink et al. | |
| 2013/0114583 A1* | 5/2013 | Park .................. | H04W 52/0216 370/338 |
| 2014/0129700 A1* | 5/2014 | Mehta ................ | H04L 43/0817 709/224 |

OTHER PUBLICATIONS

International Search Report and Written Opinion—PCT/US2016/012235—ISA/EPO—dated Apr. 11, 2016.

(Continued)

*Primary Examiner* — Wei Zhao

(74) *Attorney, Agent, or Firm* — Arent Fox, LLP

(57) ABSTRACT

A method, an apparatus, and a computer-readable medium for wireless communication are provided. In one aspect, an apparatus is configured to identify interference information associated with at least one traffic stream. The apparatus is further configured to transmit a message to an access point. The message includes a stream ID associated with the interference information and with the at least one traffic stream. The message includes the interference information, and the interference information includes an offset value and an interval/duration value.

30 Claims, 11 Drawing Sheets

(56) References Cited

OTHER PUBLICATIONS

"ISO/IEC/IEEE International Standard for Information technology—Telecommunications and Information Exchange Between Systems Local and Metropolitan Area Networks—Specific Requirements Part 11: Wireless LAN Medium Access Control (MAC) and Physical Layer (PHY) Specifications,Amendment 2: MAC Enhancements for robust audio video streaming", IEEE Standard, IEEE, Piscataway, NJ, USA, Mar. 14, 2014.

Thomson A., et al., "Interference Signalling Enhancements," Mar. 17, 2010, doc: IEEE 802.11-10/0079r1, XP017677745, Slides 19.

* cited by examiner

WLAN AP-ASSISTED MULTI-WAY COEXISTENCE

CROSS-REFERENCE TO RELATED APPLICATION(S)

This application claims the benefit of U.S. Provisional Application Ser. No. 62/100,784, entitled "WLAN AP-ASSISTED MULTI-WAY COEXISTENCE" and filed on Jan. 7, 2015, which is expressly incorporated by reference herein in its entirety.

BACKGROUND

Field

The present disclosure relates generally to communication systems, and more particularly, to wireless local area network access point-assisted multi-way coexistence.

Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, Synchronous Optical Networking (SONET), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc., frequency bands. Wireless networks advantageously facilitate user mobility and rapid field deployment when compared to fixed wired networks.

SUMMARY

The systems, methods, computer-readable medium, and devices of the invention each have several aspects, no single one of which is solely responsible for the invention's desirable attributes. Without limiting the scope of this invention as expressed by the claims which follow, some features will now be discussed briefly. After considering this discussion, and particularly after reading the section entitled "Detailed Description," one will understand how the features of this invention provide advantages for devices in a wireless network.

One aspect of this disclosure provides an apparatus (e.g., a station) for wireless communication. The apparatus is configured to identify interference information associated with at least one traffic stream. The apparatus is configured to transmit a message to an access point. The message includes a stream identifier (ID) associated with the interference information and with the at least one traffic stream, and the message includes the interference information. The interference information includes an offset value and an interval/duration value.

In another aspect of this disclosure, an apparatus for wireless communication is provided. The apparatus may include means for identifying interference information associated with at least one traffic stream and means for transmitting a message to an access point. The message may include a stream identifier associated with the interference information and with the at least one traffic stream. The message may include the interference information, and the interference information may include an offset value and an interval/duration value. In another aspect, the message may include at least one of a vendor ID, a type field, and a length field associated with the stream ID. In another configuration, the apparatus may include means for transmitting an update message to the access point. The update message may be associated with the message, and the update message may include the stream ID in the message and at least one of a second offset value or a second interval/duration value. The second offset value or the second interval/duration value may be associated with updated interference information related to the at least one traffic stream. In another configuration, the apparatus may include means for transmitting an update message to the access point. The update message may be associated with the message, and the update message may include the stream ID in the message and may indicate that the interference information associated with the stream ID is to be deleted. In another configuration, the apparatus may include means for identifying at least two non-periodic traffic streams and means for determining the interval/duration value based on the at least two non-periodic traffic streams. In this configuration, the stream ID transmitted in the message may be associated with the at least two non-periodic traffic streams. In another aspect, the stream ID may have a reserved value, and the reserved value may indicate that the message is associated with non-periodic traffic. In another aspect, the stream ID may have a reserved value, and the reserved value may indicate that all stream IDs associated with the apparatus are to be deleted. In another configuration, the apparatus may include means for receiving a beacon message or a probe response message from the access point. The beacon message or the probe response message may include information indicating whether the access point is capable of interference information processing using stream IDs. In this configuration, the apparatus may include means for determining whether the access point is capable of interference information processing using stream IDs based on the information in the beacon message or the probe response message. In another configuration, the apparatus may include means for transmitting an association message to the access point. The association message may indicate whether the apparatus is capable of using stream IDs to report interference information associated with a traffic stream. In another configuration, the apparatus may include means for transmitting a trigger message to the access point. The trigger message may be transmitted during a time period in which interference to the apparatus is not present.

In another aspect of this disclosure, a computer-readable medium of a station storing computer executable code is provided. The computer-readable medium may include code for identifying interference information associated with at least one traffic stream and for transmitting a message to an access point. The message may includes a stream ID associated with the interference information and with the at least one traffic stream. The message may include the interference information, and the interference information may include an offset value and an interval/duration value. In an aspect, the message may include at least one of a vendor ID, a type field, and a length field associated with the stream ID. In another configuration, the computer-readable medium may include code for transmitting an update message to the access point. The update message may be associated with the message, and the update message may include the stream ID in the message and at least one of a second offset value or a second interval/duration value. The second offset value or the second interval/duration value may be associated with updated interference information related to the at least one traffic stream. In another configuration, the computer-readable medium may include code for transmitting an update message to the access point. The update message may be associated with the message, and the update message may include the stream ID in the message and may indicate that the interference information associated with the stream ID is to be deleted. In another configuration, the computer-readable medium may include code for identifying at least two non-periodic traffic streams and for determining the interval/duration value based on the at least two non-periodic traffic streams. The stream ID transmitted in the message may be associated with the at least two non-periodic traffic streams. In another aspect, the stream ID may have a reserved value, and the reserved value may indicate that the message is associated with non-periodic traffic. In another aspect, the stream ID may have a reserved value, and the reserved value may indicate that all stream IDs associated with the station are to be deleted. In another configuration, the computer-readable medium may include code for receiving a beacon message or a probe response message from the access point, and the beacon message or the probe response message may include information indicating whether the access point is capable of interference information processing using stream IDs. In this configuration, the computer-readable medium may include code for determining whether the access point is capable of interference information processing using stream IDs based on the information in the beacon message or the probe response message. In another configuration, the computer-readable medium may include code for transmitting an association message to the access point. The association message may indicate whether the station is capable of using stream IDs to report interference information associated with a traffic stream. In another configuration, the computer-readable medium may include code for transmitting a trigger message to the access point, and the trigger message may be transmitted during a time period in which interference to the station is not present.

Another aspect of this disclosure provides an apparatus (e.g., an access point) for wireless communication. The apparatus is configured to receive at least one message from a station, and the at least one message includes interference information that includes an offset value and an interval/duration value. The apparatus is configured to determine whether the at least one message includes at least one of a stream ID, a vendor ID, a type field, or a length field associated with the stream ID.

In another aspect of this disclosure, an apparatus for wireless communication is provided. The apparatus may include means for receiving at least one message from a station, in which the at least one message includes interference information that comprises an offset value and an interval/duration value. The apparatus may include means for determining whether the at least one message includes at least one of a stream ID, a vendor ID, a type field, or a length field associated with the stream ID. In another configuration, the apparatus may include means for receiving a trigger message from the station and means for transmitting data to the station based on at least one of the offset value or the interval/duration value in each of the received at least one message. In one configuration, the means for transmitting data to the station may be configured to determine a transmission time window based on the at least one of the offset value or the interval/duration value in each of the received at least one message. In this configuration, the means for transmitting data may be configured to determine the transmission time window by selecting a transmission time window size that does not overlap with any future interference as determined based on the offset value or the interval/duration value in each of the received at least one message. In another configuration, the apparatus may include means for receiving an update message from the station. The update message may be associated with the received at least one message from the station, and the update message may include a second stream ID identical to the stream ID in the received at least one message and includes at least one of an updated offset value or an updated interval/duration value. In this configuration, the apparatus may include means for updating at least one of the offset value or the interval/duration value associated with the stream ID based on the updated offset value or the updated interval/duration value. In another configuration, the apparatus may include means for means for receiving an update message from the station. The update message may be associated with the received at least one message from the station, and the update message may include a second stream ID identical to the stream ID in the received at least one message. In this configuration, the apparatus may include means for deleting at least one of the offset value or the interval/duration value associated with the stream ID. In another configuration, the apparatus may include means for receiving an update message from the station. The update message may include a second stream ID having a default value indicating that all stream IDs associated with the station are to be deleted. In this configuration, the apparatus may include means for deleting all stream IDs associated with the station. In another configuration, the apparatus may include means for associating the received at least one message from the station with a reserved stream ID based on the determination that the received at least one message does not include a stream ID. In another configuration, the apparatus may include means for transmitting a beacon message or a probe response message to the station. The beacon message or the probe response message may indicate whether the access point is capable of interference information processing using stream IDs. In another configuration, the apparatus may include means for receiving an association message from the station. The association message may indicate whether the station is capable of using stream IDs to report interference information associated with a traffic stream.

In another aspect of this disclosure, a computer-readable medium of an access point storing computer executable code for wireless communication is provided. The computer-readable medium may include code for receiving at least one message from a station. The at least one message includes interference information that comprises an offset value and an interval/duration value. The computer-readable medium may include code for determining whether the at least one message includes at least one of a stream ID, a vendor ID, a type field, or a length field associated with the stream ID. In another configuration, the computer-readable medium may include code for receiving a trigger message from the station and for transmitting data to the station based on at least one of the offset value or the interval/duration value in each of the received at least one message. In another configuration, the code for transmitting data to the station may include code for determining a transmission time window based on the at least one of the offset value or the interval/duration value in each of the received at least one message. In an aspect, the code for determining the transmission time window may include code for selecting a transmission time window size that does not overlap with any future interference as determined based on the offset value or the interval/duration value in each of the received at least one message. In another configuration, the computer-readable medium may include code for receiving an update message from the station. The update message may be associated with the received at least one message from the station, and the update message may include a second stream ID identical to the stream ID in the received at least one message and include at least one of an updated offset value or an updated interval/duration value. In this configuration, the computer-readable medium may include code for updating at least one of the offset value or the interval/duration value associated with the stream ID based on the updated offset value or the updated interval/duration value. In another configuration, the computer-readable medium may include code for receiving an update message from the station. The update message may be associated with the received at least one message from the station, and the update message may include a second stream ID identical to the stream ID in the received at least one message. In this configuration, the computer-readable medium may include code for deleting at least one of the offset value or the interval/duration value associated with the stream ID. In another configuration, the computer-readable medium may include code for receiving an update message from the station. The update message may include a second stream ID having a default value indicating that all stream IDs associated with the station are to be deleted. In this configuration, the computer-readable medium may include code for deleting all stream IDs associated with the station. In another configuration, the computer-readable medium may include code for associating the received at least one message from the station with a reserved stream ID based on the determination that the received at least one message does not include a stream ID. In another configuration, the computer-readable medium may include code for transmitting a beacon message or a probe response message to the station. The beacon message or the probe response message may indicate whether the access point is capable of interference information processing using stream IDs. In another configuration, the computer-readable medium may include code for receiving an association message from the station. The association message may indicate whether the station is capable of using stream IDs to report interference information associated with a traffic stream.

DETAILED DESCRIPTION

Figure 1:
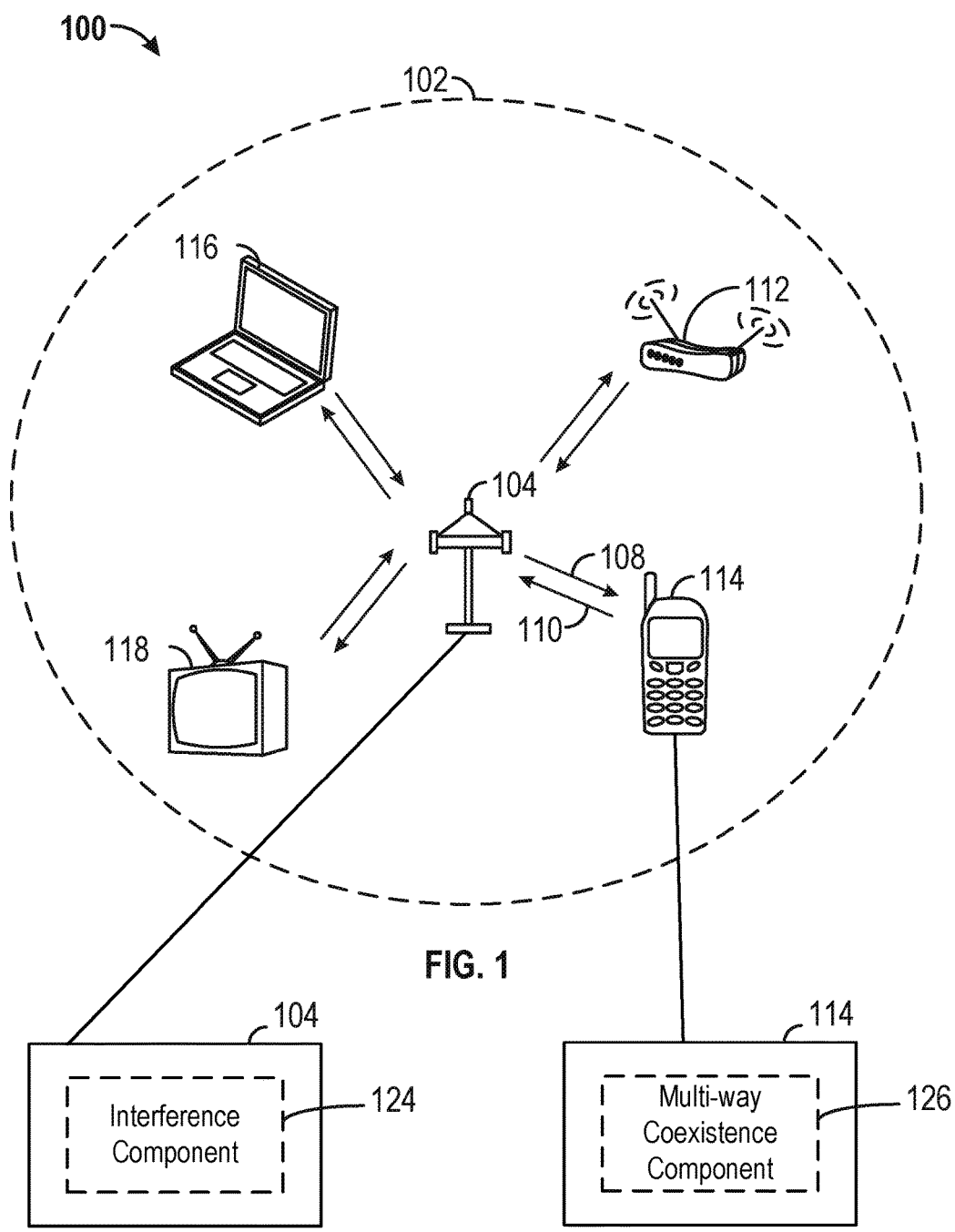
FIG. 1 shows an example wireless communication system in which aspects of the present disclosure may be employed.

Various aspects of the novel systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, computer program products, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of WLANs. A WLAN may be used to interconnect nearby devices together, employing widely used networking protocols. The various aspects described herein may apply to any communication standard, such as a wireless protocol.

In some aspects, wireless signals may be transmitted according to an 802.11 protocol using orthogonal frequency-division multiplexing (OFDM), direct-sequence spread spectrum (DSSS) communications, a combination of OFDM and DSSS communications, or other schemes. Implementations of the 802.11 protocol may be used for sensors, metering, and smart grid networks. Advantageously, aspects of certain devices implementing the 802.11 protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points (APs) and clients (also referred to as stations or "STAs"). In general, an AP may serve as a hub or base station for the WLAN and a STA serves as a user of the WLAN. For example, a STA may be a laptop computer, a personal digital assistant (PDA), a mobile phone, etc. In an example, a STA connects to an AP via a WiFi (e.g., IEEE 802.11 protocol) compliant wireless link to obtain general connectivity to the Internet or to other wide area networks. In some implementations a STA may also be used as an AP.

An access point may also comprise, be implemented as, or known as a NodeB, Radio Network Controller (RNC), eNodeB, Base Station Controller (BSC), Base Transceiver Station (BTS), Base Station (BS), Transceiver Function (TF), Radio Router, Radio Transceiver, connection point, or some other terminology.

A STA may also comprise, be implemented as, or known as an access terminal (AT), a subscriber station, a subscriber unit, a mobile station, a remote station, a remote terminal, a user terminal, a user agent, a user device, a user equipment, or some other terminology. In some implementations, the STA may comprise a cellular telephone, a cordless telephone, a Session Initiation Protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

The term "associate," or "association," or any variant thereof should be given the broadest meaning possible within the context of the present disclosure. By way of example, when a first apparatus associates with a second apparatus, it should be understood that the two apparatuses may be directly associated or intermediate apparatuses may be present. For purposes of brevity, the process for establishing an association between two apparatuses will be described using a handshake protocol that requires an "association request" by one of the apparatus followed by an "association response" by the other apparatus. It will be understood by those skilled in the art that the handshake protocol may require other signaling, such as by way of example, signaling to provide authentication.

Any reference to an element herein using a designation such as "first," "second," and so forth does not generally limit the quantity or order of those elements. Rather, these designations are used herein as a convenient method of distinguishing between two or more elements or instances of an element. Thus, a reference to first and second elements does not mean that only two elements can be employed, or that the first element must precede the second element. In addition, a phrase referring to "at least one of" a list of items refers to any combination of those items, including single members. As an example, "at least one of: A, B, or C" is intended to cover: A, or B, or C, or any combination thereof (e.g., A-B, A-C, B-C, and A-B-C).

As discussed above, certain devices described herein may implement the 802.11 standard, for example. Such devices, whether used as a STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

FIG. 1 shows an example wireless communication system 100 in which aspects of the present disclosure may be employed. The wireless communication system 100 may operate pursuant to a wireless standard, for example the 802.11 standard. The wireless communication system 100 may include an AP 104, which communicates with STAs (e.g., STAs 112, 114, 116, and 118).

A variety of processes and methods may be used for transmissions in the wireless communication system 100 between the AP 104 and the STAs. For example, signals may be sent and received between the AP 104 and the STAs in accordance with OFDM/OFDMA techniques. If this is the case, the wireless communication system 100 may be referred to as an OFDM/OFDMA system. Alternatively, signals may be sent and received between the AP 104 and the STAs in accordance with CDMA techniques. If this is the case, the wireless communication system 100 may be referred to as a CDMA system.

A communication link that facilitates transmission from the AP 104 to one or more of the STAs may be referred to as a downlink (DL) 108, and a communication link that facilitates transmission from one or more of the STAs to the AP 104 may be referred to as an uplink (UL) 110. Alternatively, a downlink 108 may be referred to as a forward link or a forward channel, and an uplink 110 may be referred to as a reverse link or a reverse channel. In some aspects, DL communications may include unicast or multicast traffic indications.

The AP 104 may suppress adjacent channel interference (ACI) in some aspects so that the AP 104 may receive UL communications on more than one channel simultaneously without causing significant analog-to-digital conversion (ADC) clipping noise. The AP 104 may improve suppression of ACI, for example, by having separate finite impulse response (FIR) filters for each channel or having a longer ADC backoff period with increased bit widths.

The AP 104 may act as a base station and provide wireless communication coverage in a basic service area (BSA) 102. A BSA (e.g., the BSA 102) is the coverage area of an AP (e.g., the AP 104). The AP 104 along with the STAs associated with the AP 104 and that use the AP 104 for communication may be referred to as a basic service set (BSS). It should be noted that the wireless communication system 100 may not have a central AP (e.g., AP 104), but rather may function as a peer-to-peer network between the STAs. Accordingly, the functions of the AP 104 described herein may alternatively be performed by one or more of the STAs.

The AP 104 may transmit on one or more channels (e.g., multiple narrowband channels, each channel including a frequency bandwidth) a beacon signal (or simply a "beacon"), via a communication link such as the downlink 108, to other nodes (STAs) of the wireless communication system 100, which may help the other nodes (STAs) to synchronize their timing with the AP 104, or which may provide other information or functionality. Such beacons may be transmitted periodically. In one aspect, the period between successive transmissions may be referred to as a superframe. Transmission of a beacon may be divided into a number of groups or intervals. In one aspect, the beacon may include, but is not limited to, such information as timestamp information to set a common clock, a peer-to-peer network identifier, a device identifier, capability information, a superframe duration, transmission direction information, reception direction information, a neighbor list, and/or an extended neighbor list, some of which are described in additional detail below. Thus, a beacon may include information that is both common (e.g., shared) amongst several devices and specific to a given device.

In some aspects, a STA (e.g., STA 114) may be required to associate with the AP 104 in order to send communications to and/or to receive communications from the AP 104. In one aspect, information for associating is included in a beacon broadcast by the AP 104. To receive such a beacon, the STA 114 may, for example, perform a broad coverage search over a coverage region. A search may also be performed by the STA 114 by sweeping a coverage region in a lighthouse fashion, for example. After receiving the information for associating, either from the beacon or probe response frames, the STA 114 may transmit a reference signal, such as an association probe or request, to the AP 104. In some aspects, the AP 104 may use backhaul services, for example, to communicate with a larger network, such as the Internet or a public switched telephone network (PSTN).

In an aspect, the AP 104 may include one or more components for performing various functions. For example, the AP 104 may include a interference component 124 to perform procedures related to assisting multi-way coexistence. In this example, the interference component 124 may be configured to receive at least one message from a station (e.g., the STA 114). The at least one message may include interference information that may include an offset value and an interval/duration value. The interference component 124 may be configured to determine whether the at least one message includes at least one of a stream ID, a vendor ID, a type field, or a length field associated with the stream ID.

In another aspect, the STA 114 may include one or more components for performing various functions. For example, the STA 114 may include a multi-way coexistence component 126 to perform procedures related to multi-way coexistence. In this example, the multi-way coexistence component 126 may be configured to identify interference information associated with at least one traffic stream. The multi-way coexistence component 126 may be configured to transmit a message to an access point (e.g., the AP 104). The message may include a stream ID associated with the interference information and with the at least one traffic stream. The message may include the interference information, and the interference information may include an offset value and an interval/duration value.

Wireless devices such as mobile phones, laptop computers, and tablets are often connected to other wireless devices to provide user services. For example, a mobile device may have a WLAN connection with an AP for browsing the Internet, voice over long term evolution (LTE) (VoLTE) for a telephone call (e.g., a VoLTE connection), and a Bluetooth (BT) connection with a hands-free headset for the telephone call. In another example, the mobile device may have concurrent WLAN connection with an AP for downloading files, a Bluetooth music connection for playing back music on speakers, and a Bluetooth Low Energy (BLE) heart monitor connection. When wireless devices transmit multiple data/traffic streams over multiple radios (or over a single radio), the transmission may cause unwanted interference to the wireless devices' reception of Wi-Fi data. As such, there is strong demand for efficient multi-way coexistence among different traffic streams from different radios and different traffic streams from the same radio to reduce interference and the likelihood of data transmission interference.

Figure 2:
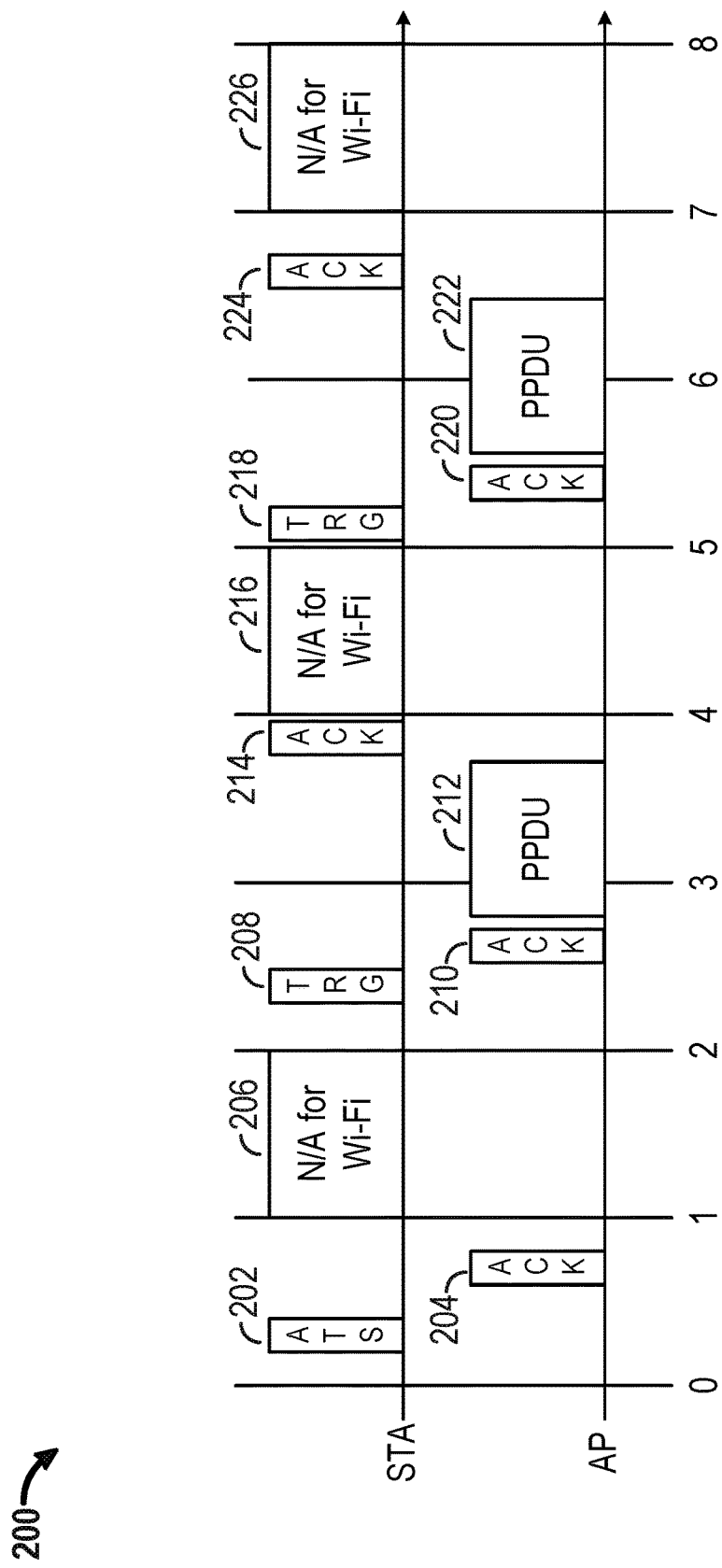
FIG. 2 is a diagram of a method of supporting coexistence for one stream (e.g., using unscheduled automatic power save delivery (U-APSD)).

FIG. 2 is a diagram 200 of a method of supporting coexistence for one stream (e.g., using unscheduled automatic power save delivery (U-APSD)). In IEEE 802.11v, for example, U-APSD coexistence supports the scheduling of interference bursts for one stream. A STA may use IEEE 802.11v signaling to advertise interference windows to an AP, and the AP may avoid downlink transmissions during those interference windows.

Referring to the FIG. 2, the STA upon identifying/determining interference bursts associated with a data stream (e.g., Bluetooth data stream), the STA may transmit an add traffic stream (ATS) frame (or message) 202 to the AP (as previously noted, the ATS frame 202 may also be known as an ADDTS frame such as in the IEEE 802.11v standards). The ATS frame 202 may indicate that the STA expects interference bursts at a number of interference windows 206, 216, 226 and is unable to receive Wi-Fi transmissions during those interference windows 206, 216, 226. The ATS frame 202 may indicate when the interference windows 206, 216, 226 may begin by using an offset value. For example, an offset value of 1 ms may indicate that a first interference window 206 starts in the following time slot if each time slot is 1 ms in length. The ATS frame 202 may also include an interval/duration value that indicates the interval (e.g., in ms) at which the interference windows 216, 226 may occur. Referring to FIG. 2, in one example, the ATS frame 202 may include an offset value of 1 ms and an interval/duration value of 3 ms. Upon successfully receiving the ATS frame 202, the AP may transmit an acknowledgment message/frame 204 to the STA. Assuming an offset value of 1 ms, the AP may not transmit Wi-Fi data to the STA in the following time slot (e.g., time slot occurring 1 ms later) in which the first interference window 206 occurs. After the first interference window 206 has passed, the STA may transmit a trigger frame (or message) 208 to the AP. The trigger frame 208 may indicate to the AP that the STA is ready to receive data transmissions. Upon successfully receiving the trigger frame 208, the AP transmits a second acknowledgment message/frame 210. Subsequently, the AP may transmit a first set of data 212 (e.g., in a physical layer convergence protocol (PLCP) protocol data unit (PPDU)) to the STA. After successfully receiving the first set of data 212, the STA may transmit a third acknowledgment frame/message 214 to the AP. In a subsequent time slot (e.g., at 4 ms), the AP may determine that the STA is experiencing another interference burst and, accordingly, the AP may not transmit data to the STA during a second interference window 216. After the second interference window 216, the STA may be ready to receive additional Wi-Fi transmissions. The STA may transmit a second trigger frame (or message) 218 to the AP. If the AP successfully receives the trigger frame 218, the AP may transmit a fourth acknowledgment message/frame 220 to the STA. Subsequently, if the AP has data to transmit to the STA, the AP may transmit a second set of data 222 in a PPDU to the STA. If the STA successfully receives the second set of data 222, the STA may transmit a fifth acknowledgment message/frame 224 to the AP. Subsequently, based on the ATS frame 202, the AP may refrain from transmitting data to the STA in a third interference window 226. In this example, the AP supports coexistence for only one stream of data. Coexistence for multiple traffic streams are not supported (e.g., by U-APSD) because there is no way to distinguish between more than one traffic stream. A need exists to support coexistence for multiple data streams with multiple periodic and/or non-periodic interference bursts.

Figure 3:
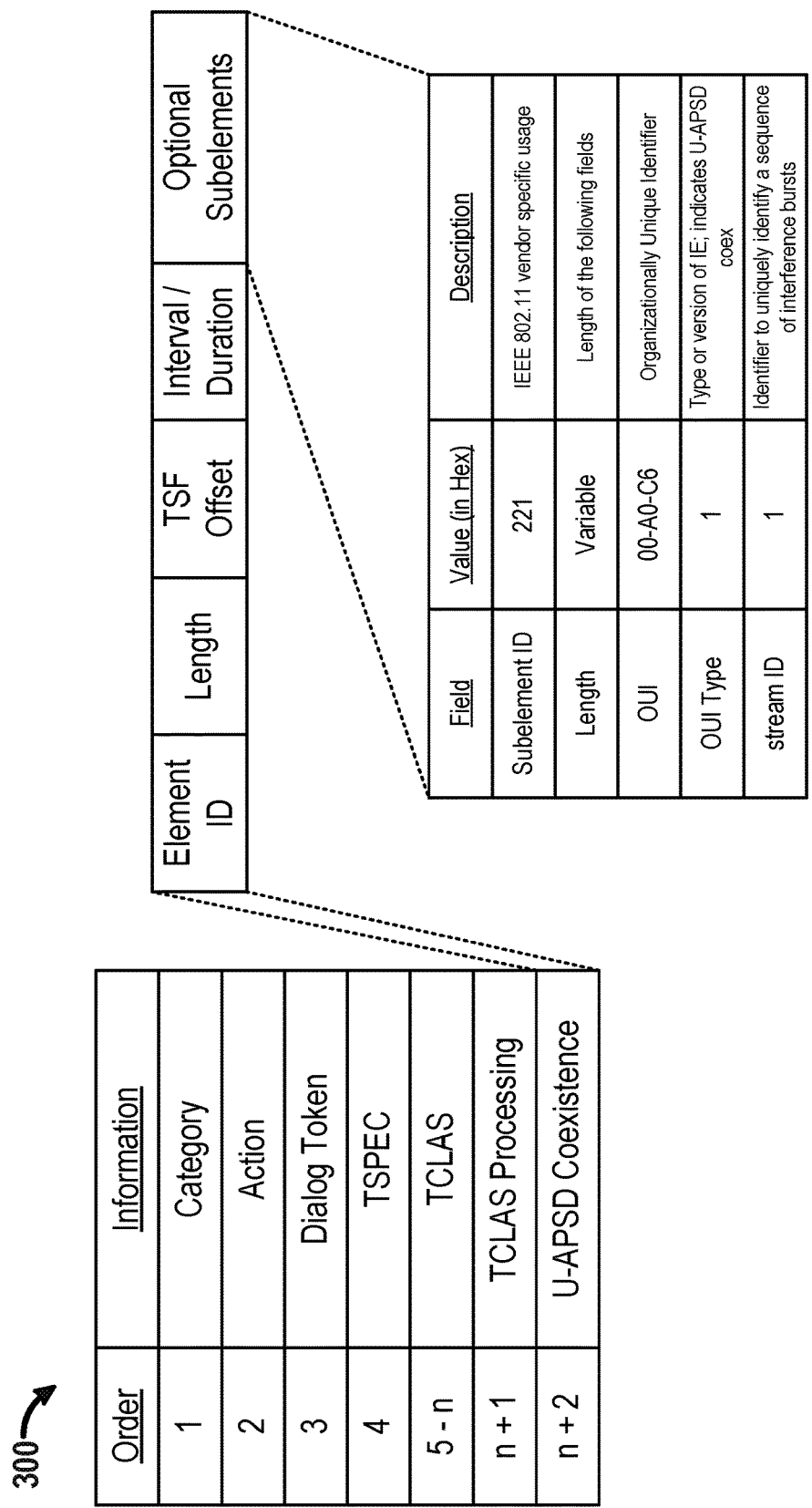
FIG. 3 is an exemplary diagram of a frame structure for an add traffic stream (ATS) frame that supports coexistence for multiple streams.

FIG. 3 is an exemplary diagram 300 of a frame structure for an add traffic stream (ATS) frame that supports coexistence for multiple streams. The ATS frame (which may also be known as an ADDTS frame in the IEEE 802.11v standards) may include several fields such as Category (e.g., 1 to represent QoS), Action, Dialog Token (a sequence number to distinguish when multiple frames of the same type are sent), TSPEC (traffic specification containing requirements such as traffic flow, packet size, expected data rates, etc.), TCLAS (defines data traffic in simpler terms when TSPEC is not supported), TCLAS Processing (TCLAS processing parameters), and U-APSD Coexistence. The U-APSD Coexistence field (or a similar field) may include additional fields or parameters such as element ID (e.g., 1 octet in size), length (e.g., 1 octet in size), timing synchronization function (TSF) offset (e.g., 8 octets in size), interval/duration (e.g., 4 octets in size), and optional subelements (e.g., of variable size). The TSF offset may indicate an offset value in units of time (e.g., milliseconds) as to when the next interference burst/interference window may occur. An ATS frame with a non-zero offset value indicates that the interference bursts/ windows may be periodic. An ATS frame for a periodic traffic stream may be considered a mode 1 request or configuration. By contrast, an ATS frame with a zero offset value may indicate that the interference bursts/windows may be non-periodic (e.g., bursty interference). An ATS frame for a non-periodic traffic stream may be considered a mode 2 request or configuration. If the TSF offset value is non-zero, then the interval/duration value may represent the time intervals at which interference bursts/windows may be expected (e.g., every 3 ms). If the TSF offset value is zero, then the interval/duration value may represent the time duration (e.g., in ms) for which the AP may transmit data to the STA. In an aspect, when the interval/duration value represents a time duration, the time duration for transmitting data may be interrupted by an interference burst/window associated with another traffic stream with periodic interference bursts.

An optional subelements subfield may also be included within the U-APSD coexistence field of the ATS frame structure. The optional subelements subfield may be utilized to support multi-way coexistence, which is a coexistence of multiple traffic streams using interference scheduling. For example, the optional subelements subfield may include additional subfields such as a subelement identifier (ID) (e.g., 1 octet in size), a length field (e.g., 3 octets in size), an OUI (organizationally unique identifier) (e.g., 1 octet in size), an OUI Type (e.g., 1 octet in size), and a stream ID (e.g., 1 octet in size). The subelement ID may be 1 octet (or 8 bits) in size and may identify one subelement among a number of other subelements in the optional subelements subfield. The length subfield may indicate the length of the OUI, OUI Type, and/or stream ID subfields. The length subfield may be 3 octets (or 24-bits) in size. The OUI may be a 3 octet identifier that uniquely identifies a vendor, manufacturer, or organization globally/worldwide (e.g., a Wi-Fi Alliance OUI) that is associated with a device transmitting the ATS frame. The OUI Type subfield may be 1 octet and may indicate that the optional subelement is for multi-way coexistence support (e.g., U-APSD coexistence v1.0, for peer-to-peer, etc.). A device that receives the ATS frame may determine how to process the optional subelement based on the information included in the OUI Type. The stream ID subfield may identify and/or be associated with a traffic stream of a device transmitting the ATS frame. The stream ID may identify different traffic streams from different radios or different traffic streams from the same radio. Although FIG. 3 provides a size (in octets) and a hexadecimal value for each of the subfields in the optional subelements subfield, the values are exemplary and any suitable value may be used.

Figure 4:
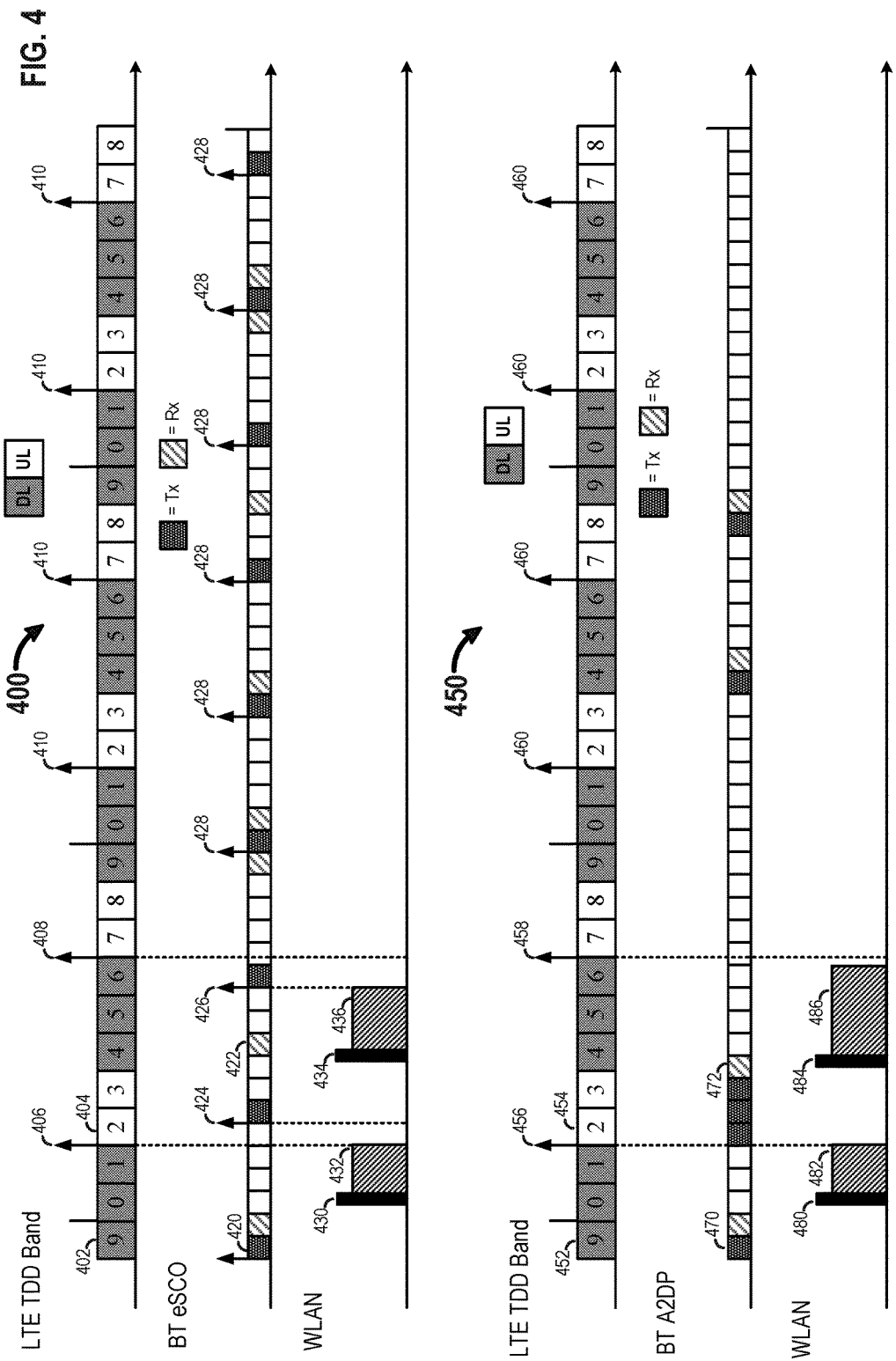
FIG. 4 contains diagrams illustrating methods of performing AP-assisted multi-way coexistence for multiple traffic streams.

FIG. 4 contains diagrams 400, 450 illustrating methods of performing AP-assisted multi-way coexistence for multiple traffic streams. Referring to diagram 400, the STA 114 (in FIG. 1) may have multiple concurrent connections with periodic transmissions or interference bursts (e.g., mode 1) such as connections that include an LTE connection (e.g., LTE time division duplex (TDD) Band 40, 2380-2400, config 1), a Bluetooth extended synchronous connection (eSCO), and a WLAN connection. For each connection, the STA 114 may transmit data by generating and transmitting a traffic stream. For example, in the LTE connection, the STA 114 may receive data in downlink traffic slots 402 and transmit data in uplink traffic slots 404. By transmitting data in the uplink traffic slots 404, the STA 114 may generate interference that impedes the successful reception of data from other connections (e.g., the WLAN connection with the AP 104 in FIG. 1). In an aspect, the STA 114 may expect interference while transmitting data in uplink traffic slots 404 and identify LTE interference information associated with the uplink LTE traffic stream. The LTE interference information may include information related to a first LTE interference burst 406, a second LTE interference burst 408, and subsequent LTE interference bursts 410 (the arrows referring to the first LTE interference burst 406, the second LTE interference burst 408, and the subsequent LTE interference bursts 410 may indicate starts of the interference bursts). In this aspect, the first LTE interference burst 406, the second LTE interference burst 408, and the subsequent LTE interference bursts 410 may occur in a periodic manner (e.g., every 5 ms). Similarly, for the Bluetooth eSCO connection, the STA 114 may transmit data in the transmit slots 420 and receive data in the receive slots 422. The STA 114 may expect interference while transmitting data in the transmit slots 420 and identify the Bluetooth interference information associated with the Bluetooth eSCO traffic stream. In an aspect, the Bluetooth eSCO interference information may include information related to a first BT interference burst 424, a second BT interference burst 426, and subsequent BT interference bursts 428 (the arrows referring to the first BT interference burst 424, the second BT interference burst 426, and the subsequent BT interference bursts 428 may indicate starts of the interference bursts).

During the various interference bursts (e.g., the LTE interference bursts 406, 408, 410 and the BT interference bursts 424, 426, 428), the STA 114 may not want to receive any Wi-Fi data transmissions from the AP 104 because the interference bursts may interfere with the ability of the STA 114 to successfully receive the Wi-Fi data transmissions.

As such, the STA 114 may report the interference bursts to the AP 104 by sending a first message or frame (e.g., an ATS frame in U-APSD coexistence mode 1 request) to the AP 104 notifying the AP 104 of when the STA 114 expects to experience LTE interference bursts. In an aspect, the STA 114 may identify interference information associated with the LTE traffic stream (a periodic traffic stream). The STA 114 may identify interference information associated with the LTE traffic stream by determining the presence of the LTE traffic stream based on the LTE connection and determine the times at which interference bursts may be generated by the LTE connection. Based on the timing information, the STA 114 may report an offset value and an interval/duration value related interference bursts to the AP 104 for purpose of scheduling transmissions from the AP 104. In an aspect, this interference information may be transmitted in the first message to the AP 104. For example, the STA 114 may transmit the first message to the AP 104, and the first message may include a first stream ID (e.g., stream ID 1) associated with the interference information, and the first stream ID may be associated with the LTE traffic stream. The interference information may include a first offset value (e.g., 1 ms) that may indicate an offset from a current time when the AP 104 may expect the first LTE interference burst 406, for example. The interference information may include a first interval/duration value (e.g., every 3.75 ms) that may indicate an interval at which the AP 104 may expect the remaining LTE interference bursts (e.g., the second LTE interference burst 408, the subsequent LTE interference bursts 410). In one configuration, the first message may also include a first vendor identifier (e.g., the OUI), a first type field (e.g., the OUI Type), and a first length field associated with the first stream ID.

In addition to LTE interference bursts, the STA 114 may also create other interference bursts. Referring to FIG. 4, the first BT interference burst 424, the second BT interference burst 426, and the subsequent BT interference bursts 428 may occur at different time offsets and at different time intervals than the LTE interference bursts (e.g., the first LTE interference burst 406, the second LTE interference burst 408, and the subsequent interference bursts 410). The AP 104 may need to know the BT interference bursts 424, 426, 428—in addition to the LTE interference bursts 406, 408, 410—in order to know when not to transmit data to the STA 114 when interference is expected. To do so, the STA 114 may report the BT interference bursts to the AP 104 by sending a second message (e.g., a second ATS frame in U-APSD coexistence mode 1 request) to the AP 104, notifying the AP 104 of when the STA 114 expects to experience BT interference bursts. In an aspect, the STA 114 may identify interference information associated with the BT eSCO traffic stream (a periodic traffic stream). The interference information may be associated with a second stream ID, and the second stream ID (e.g., stream ID 2) may be associated with the BT traffic stream. The second stream ID for the BT traffic stream may be different from the first stream ID for the LTE traffic stream. The interference information may include a second offset value (e.g., 3 ms) that may indicate when the AP 104 may expect the first BT interference burst 424, for example. The interference information may include an interval/duration value (e.g., 3.75 ms) that may indicate an interval at which the AP 104 may expect the remaining BT interference bursts (e.g., the second BT interference burst 426, the subsequent LTE interference bursts 428). In one configuration, the second message may also include a second vendor identifier (e.g., the OUI), a second type field (e.g., the OUI Type), and a second length field associated with the second stream ID. The second vendor identifier associated with BT traffic stream may be the same or different from the first vendor identifier associated with the LTE traffic stream. The second type field may be the same or different from the first type field associated with the LTE traffic stream. And the second length field associated with the second stream ID for the BT traffic stream may be different from the first length field associated with the first stream ID for the LTE traffic stream. Although this example illustrates traffic streams from different radios (e.g., a radio for LTE communication and a radio for BT communication), different traffic streams may be associated with the same radio (multiple BT connections from the same BT radio), and the STA 114 may transmit multiple messages (e.g., ATS frames) for multiple streams associated with the same radio. Furthermore, although only two streams (and stream IDs) are illustrated in diagram 400, additional streams and stream IDs may be used. Although this example illustrates interference from different radios, the interference may also be from the same radio. For example, the schedule of interference bursts may be used to represent periods of time when a WLAN radio is not available for receiving data due to other reasons (e.g., off-channel activities). For example, the WLAN radio of a STA may operate concurrently on two channels in a time-multiplexing manner, one channel for a P2P network and another channel for communicating with an AP.

The AP 104 may receive the first and second messages from the STA 114. The first and second messages may include interference information and may include an offset value and an interval/duration value. The AP 104 may determine whether the first and/or second messages include at least one of a stream ID, a vendor identifier, a type field, or a length field associated with the stream ID. On the one hand, if the AP 104 determines that the first message does not contain any stream IDs, the AP 104 may associate the first message and the interference information in the first message with a reserved stream ID (e.g., stream ID −1). For example, the AP 104 may associate the first offset value with the reserved stream ID and the first interval/duration value with the reserved stream ID. In an aspect, the AP 104 or the STA 114 may have one or more reserved stream IDs (or pre-configured stream IDs), and each stream ID may have a specific purpose (e.g., delete all streams associated with a STA or delay interference scheduling for a period of time for a certain STA such that the AP may transmit data to the STA as soon as the data becomes available).

In another example, if the first message contains the first stream ID (e.g., stream ID 1), the first vendor identifier, the first type field, and the first length field, the AP 104 may register or store the interference information (e.g., the first offset value and the first interval/duration value associated with the first stream ID) for the first stream ID. The interference information may be associated with the first stream ID and the STA 114. The interference information may be associated with the STA 114 based on the MAC address of the STA 114, which may be included in the first message.

Similarly, upon receiving the second message from the STA 114 and determining the second message includes the second stream ID, the second vendor identifier, the second type field, and the second length field, the AP 104 may register the interference information (e.g., the second offset value and the second interval/duration value associated with the second stream ID) for the second stream ID. To associate each stream ID with the appropriate or corresponding STA, the AP 104 may associate the stream ID with the MAC address of the STA from which the message was received. In an aspect, if different STAs transmit messages with a same stream ID, the AP 104 may distinguish between the stream IDs based on the MAC address of each of the STAs. For example, the AP 104 may associate the first and second stream IDs with the MAC address of the STA 114. If the STA 116 also transmits a message to the AP 104 with the same first stream ID, the AP 104 may distinguish between the stream IDs based on the different MAC addresses associated with each of the STAs 114, 116. Based on the received messages, the AP 104 may generate a schedule of interference bursts associated with the STA 114 (and other STAs) in order to determine when to transmit data to each of the STAs.

Subsequently, the STA 114 may transmit a first trigger message 430 (e.g., a U-APSD trigger message) to the AP 104. The first trigger message 430 may indicate to the AP 104 that the STA 114 is available for a data transmission. The STA 114 may transmit the first trigger message 430 when interference to the STA 114 is not present. In response receiving the first trigger message 430, the AP 104 may transmit a first data transmission 432 to the STA 114. The first data transmission 432 from the AP 104 to the STA 114 may be based on the first offset value and/or the first interval/duration received in the first message and the second offset value and/or the second interval/duration value received in the second message. In one configuration, the AP 104 may determine a transmission time window based on at least one of the first and/or second offset values and the first and/or second interval/duration values. In an aspect, the AP 104 may determine the transmission time window by identifying the type of non-periodic traffic stream (e.g., BT A2DP or BT ACL) and by selecting a transmission time window size that does not overlap with any future interference bursts as determined based on the first and/or second offset values and the first and/or second interval/duration values. Referring to diagram 400, upon receiving the first trigger message 430, the AP 104 may transmit the first data transmission 432 with a transmission window size that ends when the AP 104 expects the STA 114 to experience the first LTE interference burst 406. The transmission window size of the first data transmission 432 cannot extend in time to when the first BT interference burst 424 is expected because then the first data transmission 432 may not be successfully received by the STA 114 due to interference from the first LTE interference burst 406. Similarly, the STA 114 may transmit a second trigger message 434 to the AP 104. Upon receiving the second trigger message 434, the AP 104 may transmit a second data transmission 436 to the STA 114. The transmission time window size associated with the second data transmission 436 may end when the AP 104 expects the STA 114 to experience the second BT interference burst 426. The transmission time window size associated with the second data transmission 436 may not extend in time to when the second LTE interference burst 408 is expected because then the transmission time of the second data transmission 436 will overlap with the second BT interference burst 426, and the STA 114 may not successfully receive the second data transmission 436. By ending the transmission windows for the first data transmission 432 and the second data transmission 436 at the nearest interference burst in the future based on schedules of all interference bursts, the AP 104 may assist the STA 114 with multi-way coexistence.

In another configuration, referring to diagram 450, the STA 114 may have mixed connections with both periodic and non-periodic interference bursts. The STA 114 may have connections that include an LTE connection (e.g., LTE TDD Band 40, 2380-2400, configuration 1), a Bluetooth advanced audio distribution profile (A2DP) connection, and a WLAN connection. For each connection, the STA 114 may transmit data by generating a traffic stream. For example, in the LTE connection, the STA 114 may receive data in downlink traffic slots 452 and transmit data in uplink traffic slots 454. By transmitting data in the uplink traffic slots 454, the STA 114 may generate interference that impedes the successful reception of data from other connections (e.g., the WLAN connection with the AP 104). In an aspect, the STA 114 may expect interference while transmitting data in uplink traffic slots 454 and identify LTE interference information associated with the uplink LTE traffic stream. The LTE interference information may include information related to a third LTE interference burst 456, a fourth LTE interference burst 458, and additional LTE interference bursts 460 (the arrows referring to the third LTE interference burst 456, the fourth LTE interference burst 458, and the additional LTE interference bursts 460 may indicate starts of the interference bursts). In this aspect, the third LTE interference burst 456, the fourth LTE interference burst 458, and the additional LTE interference bursts 460 may occur in a periodic manner (e.g., every 5 ms). Similarly, for the Bluetooth A2DP connection, the STA 114 may transmit data in the transmit slots 470 and receive data in the receive slots 472. However, unlike the BT eSCO and the LTE connections, the BT A2DP connection may exhibit non-periodic transmissions and/or interference bursts. As such, the STA 114 may not be able to expect interference bursts at regular intervals. Nevertheless, coexistence among the connections may be managed by limiting the duration of the transmission window to reduce the likelihood of overlap between the BT A2DP traffic stream and the WLAN traffic stream.

Referring to diagram 450, when the STA 114 expects various interference bursts (e.g., the LTE interference bursts 456, 458, 460), the STA 114 may not want to receive Wi-Fi transmissions from the AP 104 when the interference bursts start because the interference bursts may interfere with the ability of the STA 114 to successfully receive the Wi-Fi data transmissions.

As such, the STA 114 may report the interference bursts to the AP 104 by sending a third message or frame (e.g., a third ATS frame in U-APSD coexistence mode 1 request) to the AP 104 notifying the AP 104 of when the STA 114 expects to experience LTE interference bursts. In an aspect, the STA 114 may identify interference information associated with the LTE traffic stream (a periodic traffic stream) by determining that an LTE connection exists and determining a third offset value and a third interval/duration value associated with the interference bursts of the LTE traffic stream. The STA 114 may transmit the interference information in the third message to the AP 104, and the third message may include a third stream ID (e.g., stream ID 3) associated with the interference information, and the third stream ID may be associated with the LTE traffic stream. The interference information may include the third offset value (e.g., 1 ms) that may indicate when the AP 104 may expect the third LTE interference burst 456, for example. The interference information may include the third interval/duration value (e.g., 5 ms) that may indicate an interval at which the AP 104 may expect the remaining LTE interference bursts (e.g., the fourth LTE interference burst 458, the additional LTE interference bursts 460). In one configuration, the message may also include a third vendor identifier (e.g., the OUI), a third type field (e.g., the OUI Type), and a third length field associated with the third stream ID.

With respect to the BT A2DP connection (or any other connection with non-period interference bursts), the STA 114 may send a fourth message or frame (e.g., a fourth ATS frame in U-APSD coexistence mode 2 request) to the AP 104. In an aspect, the STA 114 may identify interference information associated with the BT A2DP traffic stream (a non-periodic traffic stream). The STA 114 may transmit the fourth message to the AP 104, and the fourth message may include a fourth stream ID (e.g., stream ID 4) associated with the interference information, and the fourth stream ID may be associated with the BT A2DP traffic stream. The interference information may include a fourth offset value that may be equal to 0, which may indicate to the AP 104 that traffic stream is non-periodic (e.g., mode 2). The interference information may include a fourth interval/duration value (e.g., 2.5 ms) that indicates a time duration for which the AP 104 may transmit data to the STA 114 subject to any periodic interference bursts. In an aspect, the time duration may be for a fixed length. In one configuration, the message may also include a fourth vendor identifier (e.g., the OUT), a fourth type field (e.g., the OUT Type), and a fourth length field associated with the fourth stream ID. The fourth vendor identifier or the fourth type field may be the same or different from the third vendor identifier and/or the third type field in the third message.

The AP 104 may receive the third and fourth messages from the STA 114. The third and fourth messages may include interference information and may include respective offset values and interval/duration values. In this example, the third message may contain the third stream ID, the third vendor identifier, the third type field, and the third length field. The AP 104 may register or store the interference information (e.g., the third offset value and the third interval/ duration associated with the third stream ID) for the third stream ID. The interference information may be associated with the third stream ID and the STA 114. The interference information may be associated with the STA 114 based on the MAC address of the STA 114. Similarly, upon receiving the fourth message from the STA 114 and determining that the fourth message includes the fourth stream ID, the fourth vendor identifier, the fourth type field, and/or the fourth length field, the AP 104 may register the interference information (e.g., the fourth offset value and the fourth interval/ duration value associated with the fourth stream ID) for the fourth stream ID. In an aspect, the AP 104 may associate the third and fourth stream IDs with the MAC address of the STA 114.

Subsequently, the STA 114 may transmit a third trigger message 480 (e.g., a U-APSD trigger message) to the AP 104. The third trigger message 480 may indicate to the AP 104 that the STA 114 is available for a data transmission. The AP 104 may transmit a third data transmission 482 to the STA 114 in response receiving the third trigger message 480. However, the third data transmission 482 from the AP 104 to the STA 114 may be based on the third offset value and/or the third interval/duration received in the third message and the fourth offset value and/or the fourth interval/duration value received in the fourth message. In one configuration, the AP 104 may determine a transmission time window based on at least one of the third and/or fourth offset values and the third and/or fourth interval/duration values. In an aspect, the AP 104 may determine the transmission time window by selecting a transmission time window size that does not overlap with any future interference as determined based on the third and/or fourth offset values and the third and/or fourth interval/duration values. Referring to diagram 450, upon receiving the third trigger message 480, the AP 104 may transmit the third data transmission 482 with a transmission window size that ends when the AP 104 expects the STA 114 to experience the third LTE interference burst 456. Although the transmission window size may be set to 2.5 ms based on the interval/duration value in the fourth message, the transmission window size may be shortened so as not to overlap with the third LTE interference burst 456.

In another aspect, the STA 114 may transmit a fourth trigger message 484 to the AP 104. Upon receiving the fourth trigger message 484, the AP 104 may transmit a fourth data transmission 486 to the STA 114. The transmission time window size associated with the fourth data transmission 486 may reach the maximum 2.5 ms based on the fourth interval/duration value received in the fourth message. In this aspect, the transmission window size was able to reach the maximum duration because the maximum duration did not overlap with any interference bursts. In an aspect, each trigger message (e.g., the third trigger message 480 and the fourth trigger message 484) from the STA 114 may define a WLAN downlink window with a fixed size (e.g., equal to the time duration of the interval/duration value such as 2.5 ms) that is negotiated between the AP 104 and the STA 114 through signaling (e.g., U-APSD signaling).

In another configuration, when the interference burst associated with a traffic stream changes, the STA 114 may transmit an update (or maintenance) message to the AP 104 with updated interference information. The update message may be associated with the first message from the STA 114 to the AP 104 (or any other coexistence request message that the AP 104 previously received from the 114), in which the first message included the first stream ID, the first offset value, and the first interval/duration value. The update message may include the same stream ID as in the first message (or the stream ID of another message to which the update message is associated with). The update message may also include an updated offset value and/or an updated interval/duration value. The AP 104 may receive the update message from the STA 114 and determine that the update message is associated with the first message received from the STA 114 because the update message includes a stream ID that is identical to the stream ID in the first message. The AP 104 may update the offset value and/or the interval/ duration value associated with the stream ID in the initial message based on the updated offset value and/or the updated interval/duration value in the update message.

In another configuration, when a traffic stream ceases to exist, the STA 114 may transmit an update (or maintenance) message (e.g., a delete traffic stream frame or an add traffic stream frame with the optional subelement indicating a delete action and optionally a stream ID) to the AP 104. The update message may be associated with the first message from the STA 114 to the AP 104, for example, in which the first message included the first stream ID, the first offset value, and the first interval/duration value. The update message may include the same stream ID as the first message. The update message may also instruct or indicate that the interference information (e.g., the offset value and/or the interval/duration value) associated with the first stream ID in the first message is to be deleted. In another aspect, the STA 114 may utilize a reserved value for the stream ID, and the reserved value may indicate that all stream IDs associated with the STA 114 are to be deleted. This enables the STA 114 to efficiently request that all inactive stream IDs be deleted rather than having to transmit a separate message to delete each stream ID. The AP 104 may receive the update message from the AP 104, and the update message may be associated with the received first message from the STA 114 (or any other received message from the STA 114). The update message may include a stream ID that is identical to the stream ID in the first message. In one aspect, the AP 104 may delete the offset value and/or the interval duration value associated with the stream ID. In another aspect, if the stream ID is a reserved stream ID that indicates all stream IDs are to be deleted, the AP 104 may delete all stream IDs associated with the STA 114.

In another configuration, the STA 114 may have multiple non-periodic interference sources (e.g., A2DP and asynchronous connection-less (ACL) connections for best-effort traffic). In this configuration, the STA 114 may identify an A2DP traffic stream and an ACL traffic stream, for example, and determine a time window duration value suitable to both data flows. The STA 114 may identify the two non-periodic traffic streams by determining which applications are active on the STA 114 and determining the required connections associated the active applications. After identifying the A2DP and ACL traffic streams, for example, the STA 114 may determine a time window duration value suitable to A2DP and a time window duration value suitable to ACL. Next, the STA 114 may select the minimum (or maximum or average) value based on the two duration values. Similar selection methods may be used if there are more than 2 non-periodic traffic streams. The selected duration value may be sent in a message to the AP 104 (e.g., in the ATS frame). Messages related to non-periodic traffic may have a common stream ID. That is, if the AP has 2 non-periodic traffic streams, both streams may share (and be associated with) a single stream ID (this may also be the case if there are more than 2 non-periodic traffic streams). In an aspect, the STA 114 may utilize a reserved value for the stream ID (such as stream ID 0), and the reserved value indicates that the message and stream ID is associated with one or more non-periodic traffic/interference bursts.

In another configuration, the STA 114 may determine whether the AP 104 is capable of interference information processing using stream IDs before sending messages with stream IDs to the AP 104. In this configuration, the STA 114 may receive a beacon message or a probe response message from the AP 104. The beacon message or the probe response message may include information (e.g., a bit indicator, 0=not stream ID enabled; 1=stream ID enabled) indicating whether the AP 104 is capable of interference information processing using stream IDs. Based on the information in the received beacon message or the probe response message, the STA 114 may determine whether the AP 104 is capable of interference information processing using stream IDs.

In another configuration, the STA 114 may communicate information to the AP 104 to indicate whether the STA 114 is capable of using stream IDs to report interference information (e.g., for mode 1 and/or mode 2). For example, the STA 114 may transmit an association message to the AP 104. The association message may indicate whether the STA 114 is capable of using stream IDs to report interference information associated with a traffic stream.

In yet another configuration, the STA 114 may want to receive high priority data transmissions from the AP 104 even when the STA 114 may be expecting interference bursts. In this configuration, when the STA 114 expects high priority data from the AP 104, the STA 114 may transmit a trigger message to the AP 104 during a time period in which the interference to the STA 114 is present.

Figure 5:
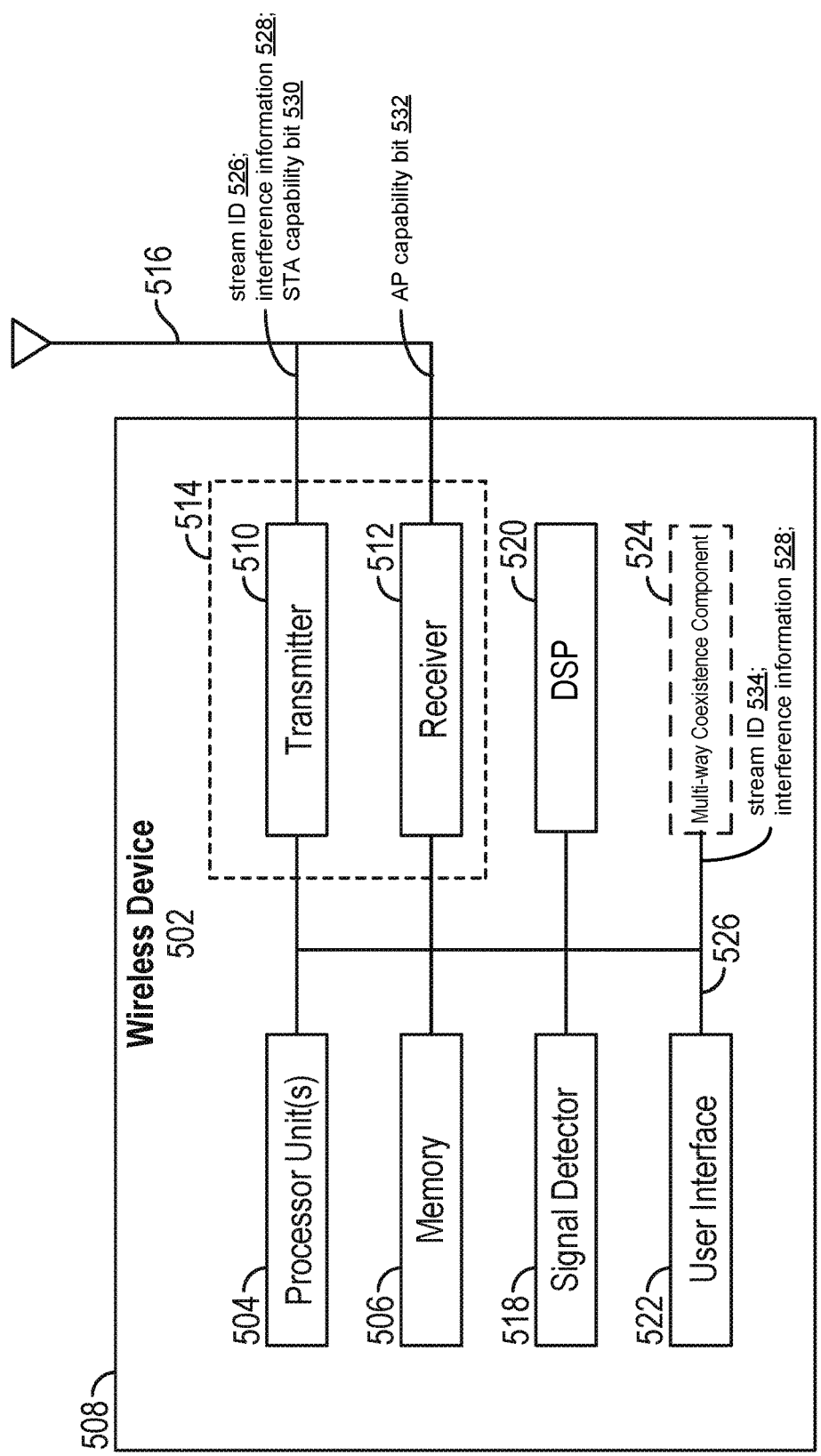
FIG. 5 shows an example functional block diagram of a wireless device that may perform AP-assisted multi-way coexistence for communicating within the wireless communication system of FIG. 1.

FIG. 5 shows an example functional block diagram of a wireless device 502 that may perform AP-assisted multi-way coexistence for communicating within the wireless communication system 100 of FIG. 1. The wireless device 502 is an example of a device that may be configured to implement the various methods described herein. For example, the wireless device 502 may comprise one of the STAs 112, 114, 116, and 118.

The wireless device 502 may include a processor 504 which controls operation of the wireless device 502. The processor 504 may also be referred to as a central processing unit (CPU). Memory 506, which may include both read-only memory (ROM) and random access memory (RAM), may provide instructions and data to the processor 504. A portion of the memory 506 may also include non-volatile random access memory (NVRAM). The processor 504 typically performs logical and arithmetic operations based on program instructions stored within the memory 506. The instructions in the memory 506 may be executable (by the processor 504, for example) to implement the methods described herein.

The processor 504 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 502 may also include a housing 508, and the wireless device 502 may include a transmitter 510 and/or a receiver 512 to allow transmission and reception of data between the wireless device 502 and a remote device. The transmitter 510 and the receiver 512 may be combined into a transceiver 514. An antenna 516 may be attached to the housing 508 and electrically coupled to the transceiver 514. The wireless device 502 may also include multiple transmitters, multiple receivers, multiple transceivers, and/or multiple antennas.

The wireless device 502 may also include a signal detector 518 that may be used to detect and quantify the level of signals received by the transceiver 514 or the receiver 512. The signal detector 518 may detect such signals as total energy, energy per subcarrier per symbol, power spectral density, and other signals. The wireless device 502 may also include a digital signal processor (DSP) 520 for use in processing signals. The DSP 520 may be configured to generate a packet for transmission. In some aspects, the packet may comprise a PPDU.

The wireless device 502 may further comprise a user interface 522 in some aspects. The user interface 522 may comprise a keypad, a microphone, a speaker, and/or a display. The user interface 522 may include any element or component that conveys information to a user of the wireless device 502 and/or receives input from the user.

When the wireless device 502 is implemented as a STA (e.g., STA 114), the wireless device 502 may also comprise a multi-way coexistence component 524. The multi-way coexistence component 524 may be configured to identify interference information (e.g., interference information 528) associated with at least one traffic stream. The multi-way coexistence component 524 may be configured to transmit a message to an access point, and the message may include a stream ID (e.g., stream ID 534) associated with the interference information and with the at least one traffic stream. The message may include the interference information, and the interference information may include an offset value and an interval/duration value. In an aspect, the message may further include at least one of a vendor identifier, a type field, and a length field associated with the stream ID. In another configuration, the multi-way coexistence component 524 may be configured to transmit an update message to the access point, and the update message may be associated with the message. The update message may include the stream ID in the message and at least one of a second offset value or a second interval/duration value. The second offset value or the second interval/duration value may be associated with updated interference information related to the at least one traffic stream. In another configuration, the multi-way coexistence component 524 may be configured to transmit an update message to the access point, and the update message may be associated with the message. The update message may include the stream ID in the message and may indicate that the interference information associated with the stream ID is to be deleted. In another configuration, the multi-way coexistence component 524 may be configured to identify at least two non-periodic traffic streams and determine the interval/duration value based on the at least two non-periodic traffic streams. The stream ID transmitted in the message may be associated with the at least two non-periodic traffic streams. In an aspect, the stream ID may have a reserved value, and the reserved value may indicate that the message is associated with non-periodic traffic. In another aspect, the stream ID may have a reserved value, and the reserved value may indicate that all stream IDs associated with the station are to be deleted. In another configuration, the multi-way coexistence component 524 may be configured to receive a beacon message or a probe response message from the access point, and the beacon message or the probe response message may include information indicating whether the access point is capable of interference information processing using stream IDs. In this configuration, the multi-way coexistence component 524 may be configured to determine whether the access point is capable of interference information processing using stream IDs based on the information in the beacon message or the probe response message (e.g., based on an AP capability bit 532). In another configuration, the multi-way coexistence component 524 may be configured to transmit an association message to the access point, and the association message may indicate whether the station is capable of using stream IDs to report interference information associated with a traffic stream (e.g., based on a STA capability bit 530). In another configuration, the multi-way coexistence component 524 may be configured to transmit a trigger message to the access point, and the trigger message may be transmitted during a time period in which interference to the station is not present.

The various components of the wireless device 502 may be coupled together by a bus system 526. The bus system 526 may include a data bus, for example, as well as a power bus, a control signal bus, and a status signal bus in addition to the data bus. Components of the wireless device 502 may be coupled together or accept or provide inputs to each other using some other mechanism.

Although a number of separate components are illustrated in FIG. 5, one or more of the components may be combined or commonly implemented. For example, the processor 504 may be used to implement not only the functionality described above with respect to the processor 504, but also to implement the functionality described above with respect to the signal detector 518, the DSP 520, the user interface 522, and/or the multi-way coexistence component 524. Further, each of the components illustrated in FIG. 5 may be implemented using a plurality of separate elements.

Figure 6:
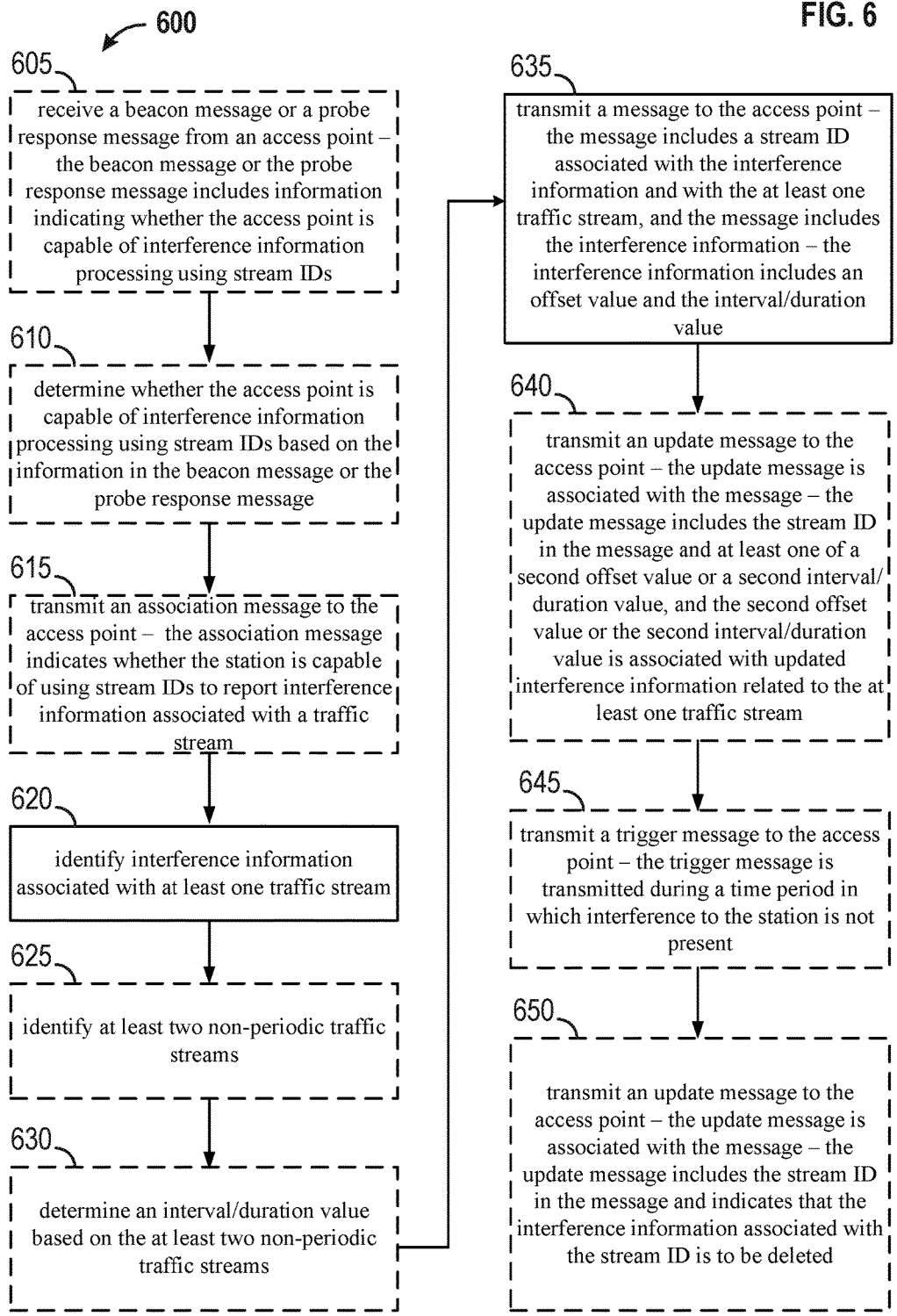
FIG. 6 is a flowchart of an example method of performing multi-way coexistence.

FIG. 6 is a flowchart of an example method 600 of performing multi-way coexistence. The method 600 may be performed using an apparatus (e.g., the STA 114 or the wireless device 502, for example). Although the method 600 is described below with respect to the elements of wireless device 502 of FIG. 5, other components may be used to implement one or more of the steps described herein. In an aspect, blocks delineated with dotted lines may represent optional operations.

At block 605, the apparatus may receive a beacon message or a probe response message from an access point. The beacon message or the probe response message may include information indicating whether the access point is capable of interference information processing using stream IDs. For example, the apparatus may correspond to the STA 114, and the STA 114 may receive a beacon message or a probe response message from the AP 104. The beacon message may include information indicating that the AP 104 is capable of interference information processing using stream IDs.

At block 610, the apparatus may determine whether the access point is capable of interference information processing using stream IDs based on the information in the beacon message or the probe response message. For example, the beacon message received from the AP 104 may include information indicating that the AP 104 is capable of interference information processing using stream IDs. The information may be a bit value. Based on the information included in the beacon message, the STA 114 may determine that the AP 104 is capable of interference information processing using stream IDs. In this example, if the bit value is set to 1, then the AP 104 is capable of interference information processing, and if the bit value is set to 0, then the AP 104 is not capable of interference information processing.

At block 615, the apparatus may transmit an association message to the access point. The association message may indicate whether the station is capable of using stream IDs to report interference information associated with a traffic stream. For example, the STA 114 may transmit an association message to the AP 104. The association message may indicate that the STA 114 is capable of using stream IDs to report interference information associated with a traffic streams (e.g., LTE, BT, etc.).

At block 620, the apparatus may identify interference information associated with at least one traffic stream. For example, the STA 114 may have an LTE connection. The STA 114 may identify the interference information by determining that with respect to the LTE connection, the STA 114 is scheduled to transmit at various time slots or traffic slots. The STA 114 may determine an offset value (e.g., a TSF offset value) associated with when the first interference burst is expected an interval at which subsequent interference bursts may be expected.

At block 625, the apparatus may identify at least two non-periodic traffic streams. For example, the STA 114 may identify at least two non-periodic traffic streams by determining a set of current connections and determining which connection in the set of current connections transmits non-period traffic. For example, the STA 114 may determine a BT A2DP connection and a BT ACL connection—both of which have non-periodic traffic streams and non-periodic BT interference bursts.

At block 630, the apparatus may determine an interval/duration value based on the at least two non-periodic traffic streams. For example, the STA 114 may determine an interval/duration value based on the BT A2DP connection and the BT ACL connection. The STA 114 may determine that the BT A2DP connection has an interval/duration value of 2.5 ms, and the STA 114 may determine that the BT ACL connection has an interval/duration value of 5 ms. Each of the duration values may represent a time duration during which the STA 114 is available to receive transmissions from the AP 104. The STA 114 may choose the minimum interval/duration value—2.5 ms—to represent both connections.

At block 635, the apparatus may transmit a message to an access point. The message may include a stream ID associated with the interference information and with the at least one traffic stream, and the message may include the interference information. The interference information may include an offset value and an interval/duration value. In an aspect, the offset value may indicate when a next interference burst/interference window may occur (e.g., offset from a current time). In another aspect, the stream ID may be associated with at least two non-periodic traffic streams. In one example, referring to FIG. 4, the STA 114 may transmit the first message to the AP 104. The first message may include a stream ID 1 associated with an LTE traffic stream, and the stream ID 1 may be associated with interference information. The interference information may include an offset value 1 ms, and an interval/duration value 5 ms. In another example, referring to FIG. 4, the STA 114 may transmit the fourth message to the AP 104. The fourth message may include a stream ID 0 associated with a BT A2DP traffic stream and the stream ID 0 may be associated with interference information. The interference information may include an offset value of 0, and an interval/duration value of 5 ms. In yet another example, the STA 114 may transmit the fourth message to the AP 104. The fourth message may include a stream ID 0 associated with a BT A2DP traffic stream and a BT ACL traffic stream, and the stream ID 0 may be associated with interference information associated with both the BT A2DP and BT ACL traffic streams. The interference information may include an offset value of 0 and an interval/duration value of 2.5 ms by selecting the minimum value between a 2.5 ms interval/duration value for the BT A2DP traffic stream and a 5 ms interval/duration value for the BT ACL traffic stream.

At block 640, the apparatus may transmit an update message to the access point. The update message may be associated with the message. The update message may include the stream ID in the message and at least one of a second offset value or a second interval/duration value, and the second offset value or the second interval/duration value may be associated with updated interference information related to the at least one traffic stream. For example, referring to diagram 400 in FIG. 4, the STA 114 may have (or be assigned) different LTE resources, thereby causing a change in the LTE interference bursts. To report the new interference bursts to the AP 104, the STA 114 may transmit an update message to the AP 104. The update message may be associated the first message to the AP 104. The update message may include the same stream ID 1 as in the first message and an updated offset value of 2 ms and an updated interval/duration value of 3 ms. The updated offset and interval/duration values may be associated with the updated interference burst information related to the LTE traffic stream.

At block 645, the apparatus may transmit a trigger message to the access point. The trigger message may be transmitted during a time period in which interference to the apparatus is not present. For example, referring to diagram 400 of FIG. 4, the STA 114 may transmit the second trigger message 434 during a time period that does not overlap with the uplink traffic slots 404.

At block 650, the apparatus may transmit an update message to the access point. The update message may be associated with the message. The update message may include the stream ID in the message and may indicate that the interference information associated with the stream ID is to be deleted. For example, referring to FIG. 4, the STA 114 may transmit an update message to the AP 104. The update message may be associated with the first message. The update message may include the stream ID 1 in the first message and may indicate that the interference information (e.g., the offset value and/or the interval/duration value) associated with stream ID 1 is to be deleted by the AP 104.

Figure 7:
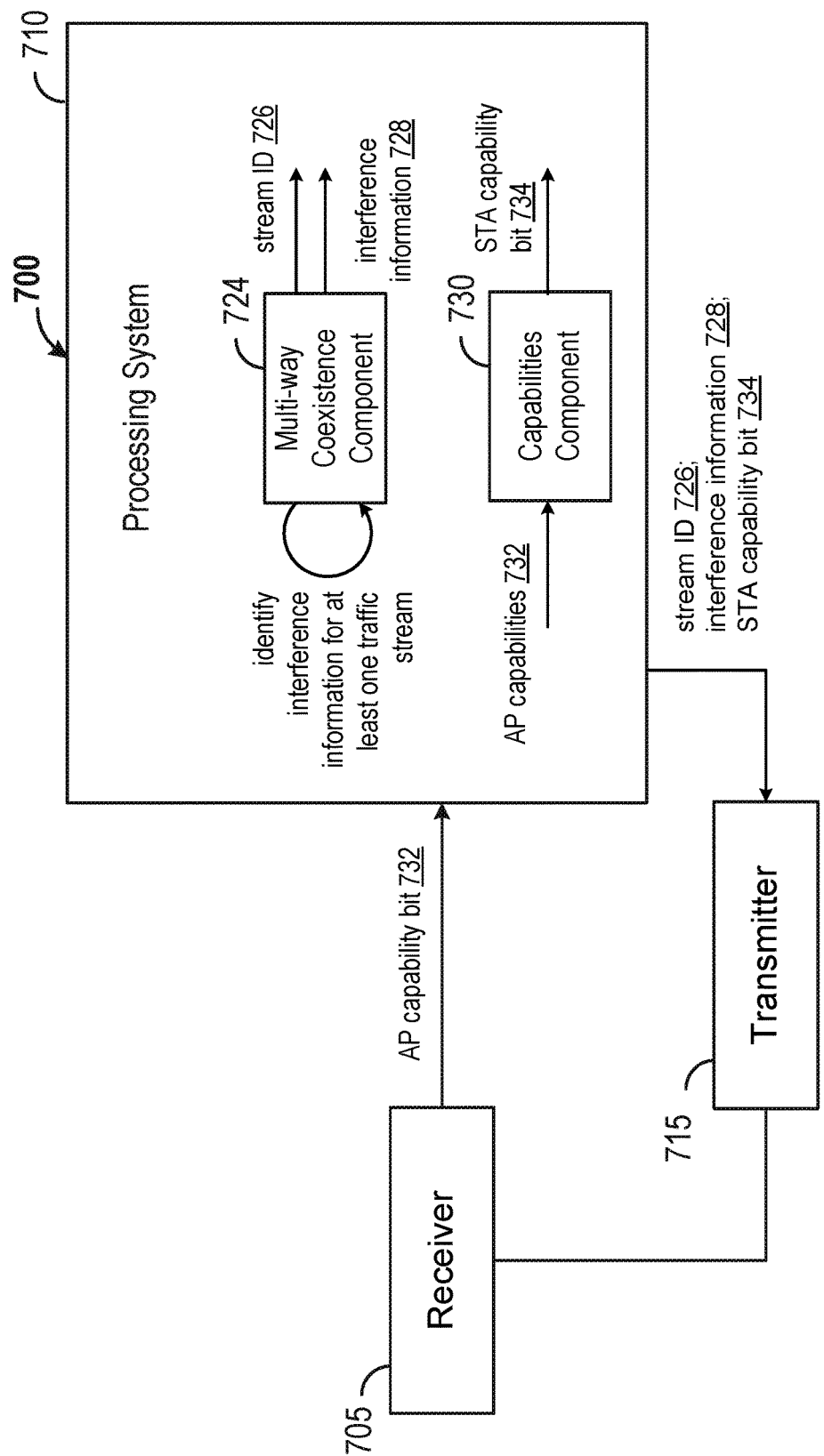
FIG. 7 is a functional block diagram of an example wireless communication device that performs multi-way coexistence.

FIG. 7 is a functional block diagram of an example wireless communication device 700 that performs multi-way coexistence. The wireless communication device 700 may include a receiver 705, a processing system 710, and a transmitter 715. The processing system 710 may include a multi-way coexistence component 724, and/or a capabilities component 730. The processing system 710 and/or the multi-way coexistence component 724 may be configured to identify interference information (e.g., interference information 728) associated with at least one traffic stream. The processing system 710, the multi-way coexistence component 724, and/or the transmitter 715 may be configured to transmit a message to an access point. The message may include a stream ID (e.g., a stream ID 726) associated with the interference information and with the at least one traffic stream. The message may include the interference information, and the interference information may include an offset value and an interval/duration value. In an aspect, the message may further include at least one of a vendor ID, a type field, and a length field associated with the stream ID. In one configuration, the processing system 710, the multi-way coexistence component 724, and/or the transmitter 715 may be configured to transmit an update message to the access point. The update message may be associated with the message, and the update message may include the stream ID in the message and at least one of a second offset value or a second interval/duration value. The second offset value or the second interval/duration value may be associated with updated interference information related to the at least one traffic stream. In another configuration, the processing system 710, the multi-way coexistence component 724, and/or the transmitter 715 may be configured to transmit an update message to the access point. The update message may be associated with the message, and the update message may include the stream ID in the message and indicate that the interference information associated with the stream ID is to be deleted. In another configuration, the processing system 710 and/or the multi-way coexistence component 724 may be configured to identify at least two non-periodic traffic streams. The processing system 710 and/or the multi-way coexistence component 724 may be configured to determine the interval/duration value based on the at least two non-periodic traffic streams. The stream ID transmitted in the message may be associated with the at least two non-periodic traffic streams. In an aspect, the stream ID may have a reserved value, and the reserved value may indicate that the message is associated with non-periodic traffic. In another aspect, the stream ID may have a reserved value, and the reserved value may indicate that all stream IDs associated with the wireless communication device 700 are to be deleted. In another configuration, the processing system 710, the multi-way coexistence component 724, the capabilities component 730, and/or the receiver 705 may be configured to receive a beacon message or a probe response message from the access point. The beacon message or the probe response message may include information indicating whether the access point is capable of interference information processing using stream IDs (e.g., an AP capability bit 732). The processing system 710, the capabilities component 730, and/or the multi-way coexistence component 724 may be configured to determine whether the access point is capable of interference information processing using stream IDs based on the information in the beacon message or the probe response message. In another configuration, the processing system 710, the multi-way coexistence component 724, the capabilities component 730, and/or the transmitter 715 may be configured to transmit an association message to the access point. The association message may indicate whether the wireless communication device 700 is capable of using stream IDs to report interference information associated with a traffic stream (e.g., a STA capability bit 734). In another configuration, the processing system 710, the multi-way coexistence component 724, and/or the transmitter 715 may be configured to transmit a trigger message to the access point, and the trigger message may be transmitted during a time period in which interference to the wireless communication device 700 is not present.

The receiver 705, the processing system 710, the multi-way coexistence component 724, and/or the transmitter 715 may be configured to perform one or more functions discussed above with respect to blocks 605, 610, 615, 620, 625, 630, 635, 640, 645, and 650 of FIG. 6. The receiver 705 may correspond to the receiver 512. The processing system 710 may correspond to the processor 504. The transmitter 715 may correspond to the transmitter 510. The multi-way coexistence component 724 may correspond to the multi-way coexistence component 126 and/or the multi-way coexistence component 524.

In one configuration, the wireless communication device 700 may include means for identifying interference information associated with at least one traffic stream. The wireless communication device 700 may include means for transmitting a message to an access point, and the message may include a stream ID associated with the interference information and with the at least one traffic stream. The message may include the interference information, and the interference information may include an offset value and an interval/duration value. In an aspect, the message may further include at least one of a vendor ID, a type field, and a length field associated with the stream ID. In another configuration, the wireless communication device 700 may include means for transmitting an update message to the access point, and the update message may be associated with the message. The update message may include the stream ID in the message and at least one of a second offset value or a second interval/duration value, and the second offset value or the second interval/duration value may be associated with updated interference information related to the at least one traffic stream. In another configuration, the wireless communication device 700 may include means for transmitting an update message to the access point, and the update message may be associated with the message. The update message may include the stream ID in the message and may indicate that the interference information associated with the stream ID is to be deleted. In another configuration, the wireless communication device 700 may include means for identifying at least two non-periodic traffic streams and means for determining the interval/duration value based on the at least two non-periodic traffic streams. The stream ID transmitted in the message may be associated with the at least two non-periodic traffic streams. In another aspect, the stream ID may have a reserved value, and the reserved value may indicate that the message is associated with non-periodic traffic. In another aspect, the stream ID may have a reserved value, and the reserved value may indicate that all stream IDs associated with the station are to be deleted. In another configuration, the wireless communication device 700 may include means for receiving a beacon message or a probe response message from the access point. The beacon message or the probe response message may include information indicating whether the access point is capable of interference information processing using stream IDs. In this configuration, the wireless communication device 700 may include means for determining whether the access point is capable of interference information processing using stream IDs based on the information in the beacon message or the probe response message. In another configuration, the wireless communication device 700 may include means for transmitting an association message to the access point, and the association message may indicate whether the station is capable of using stream IDs to report interference information associated with a traffic stream. In another configuration, the wireless communication device 700 may include means for transmitting a trigger message to the access point, and the trigger message may be transmitted during a time period in which interference to the station is not present.

For example, means for identifying interference information may include the processing system 710 and/or the multi-way coexistence component 724. Means for transmitting may include the processing system 710, the multi-way coexistence component 724, and/or the transmitter 715. Means for identifying at least two non-periodic traffic streams may include the processing system 710 and/or the multi-way coexistence component 724. Means for determining the interval/duration value may include the processing system 710 and/or the multi-way coexistence component 724. Means for receiving may include the processing system 710, the multi-way coexistence component 724, and/or the receiver 705. Means for determining whether the access point is capable of interference information processing using stream IDs the processing system 710, the capabilities component 730, and/or the multi-way coexistence component 724.

Figure 8:
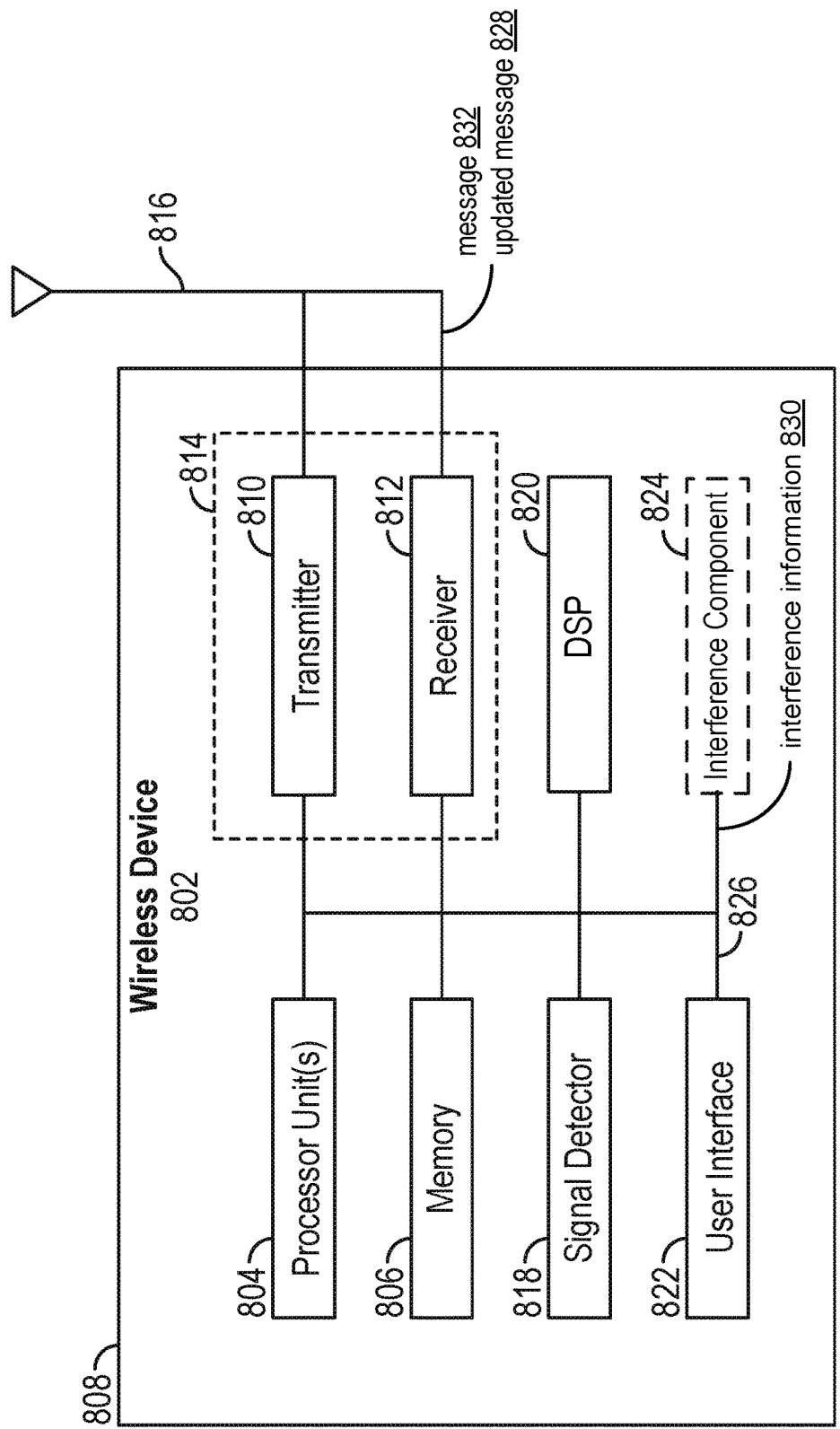
FIG. 8 shows an example functional block diagram of a wireless device supporting multi-way coexistence within the wireless communication system of FIG. 1.

FIG. 8 shows an example functional block diagram of a wireless device 802 supporting multi-way coexistence within the wireless communication system 100 of FIG. 1. The wireless device 802 is an example of a device that may be configured to implement the various methods described herein. For example, the wireless device 802 may comprise the AP 104.

The wireless device 802 may include a processor 804 which controls operation of the wireless device 802. The processor 804 may also be referred to as a CPU. Memory 806, which may include both ROM and RAM, may provide instructions and data to the processor 804. A portion of the memory 806 may also include NVRAM. The processor 804 typically performs logical and arithmetic operations based on program instructions stored within the memory 806. The instructions in the memory 806 may be executable (by the processor 804, for example) to implement the methods described herein.

The processor 804 may comprise or be a component of a processing system implemented with one or more processors. The one or more processors may be implemented with any combination of general-purpose microprocessors, microcontrollers, DSPs, PGAs, PLDs, controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 802 may also include a housing 808, and the wireless device 802 may include a transmitter 810 and/or a receiver 812 to allow transmission and reception of data between the wireless device 802 and a remote device. The transmitter 810 and the receiver 812 may be combined into a transceiver 814. An antenna 816 may be attached to the housing 808 and electrically coupled to the transceiver 814. The wireless device 802 may also include multiple transmitters, multiple receivers, multiple transceivers, and/or multiple antennas.

The wireless device 802 may also include a signal detector 818 that may be used to detect and quantify the level of signals received by the transceiver 814 or the receiver 812. The signal detector 818 may detect such signals as total energy, energy per subcarrier per symbol, power spectral density, and other signals. The wireless device 802 may also include a DSP 820 for use in processing signals. The DSP 820 may be configured to generate a packet for transmission. In some aspects, the packet may comprise a PPDU.

The wireless device 802 may further comprise a user interface 822 in some aspects. The user interface 822 may comprise a keypad, a microphone, a speaker, and/or a display. The user interface 822 may include any element or component that conveys information to a user of the wireless device 802 and/or receives input from the user.

When the wireless device 802 is implemented as an AP (e.g., AP 104), the wireless device 802 may also comprise an interference component 824. The interference component 824 may be configured to receive at least one message (e.g., a message 832) from a station. The at least one message may include interference information (e.g., interference information 830) that includes an offset value and an interval/duration value. The interference component 824 may be configured to determine whether the at least one message includes at least one of a stream ID, a vendor ID, a type field, or a length field associated with the stream ID. The interference component 824 may be configured to receive a trigger message from the station. The interference component 824 may be configured to transmit data to the station based on at least one of the offset value or the interval/duration value in each of the received at least one message. In an aspect, the interference component 824 may be configured to transmit data to the station by determining a transmission time window based on the at least one of the offset value or the interval/duration value in each of the received at least one message. The interference component 824 may determine the transmission time window by selecting a transmission time window size that does not overlap with any future interference as determined based on the offset value or the interval/duration value in each of the received at least one message. The interference component 824 may be configured to receive an update message (e.g., an update message 828) from the station. The update message may be associated with the received at least one message from the station, and the update message may include a second stream ID identical to the stream ID in the received at least one message and may include at least one of an updated offset value or an updated interval/duration value. The interference component 824 may be configured to update at least one of the offset value or the interval/duration value associated with the stream ID based on the updated offset value or the updated interval/duration value. The interference component 824 may be configured to receive an update message from the station. The update message may be associated with the received at least one message from the station. The update message may include a second stream ID identical to the stream ID in the received at least one message. The interference component 824 may be configured to delete at least one of the offset value or the interval/duration value associated with the stream ID. The interference component 824 may be configured to receive an update message from the station. The update message may include a second stream ID having a default value indicating that all stream IDs associated with the station are to be deleted. The interference component 824 may be configured to delete all stream IDs associated with the station. The interference component 824 may be configured to associate the received at least one message from the station with a reserved stream ID based on the determination that the received at least one message does not include a stream ID. The interference component 824 may be configured to transmit a beacon message or a probe response message to the station, and the beacon message or the probe response message may indicate whether the wireless device 802 is capable of interference information processing using stream IDs. The interference component 824 may be configured to receive an association message from the station, and the association message may indicate whether the station is capable of using stream IDs to report interference information associated with a traffic stream.

The various components of the wireless device 802 may be coupled together by a bus system 826. The bus system 826 may include a data bus, for example, as well as a power bus, a control signal bus, and a status signal bus in addition to the data bus. Components of the wireless device 802 may be coupled together or accept or provide inputs to each other using some other mechanism.

Although a number of separate components are illustrated in FIG. 8, one or more of the components may be combined or commonly implemented. For example, the processor 804 may be used to implement not only the functionality described above with respect to the processor 804, but also to implement the functionality described above with respect to the signal detector 818, the DSP 820, the user interface 822, and/or the interference component 824. Further, each of the components illustrated in FIG. 8 may be implemented using a plurality of separate elements.

Figure 9A:
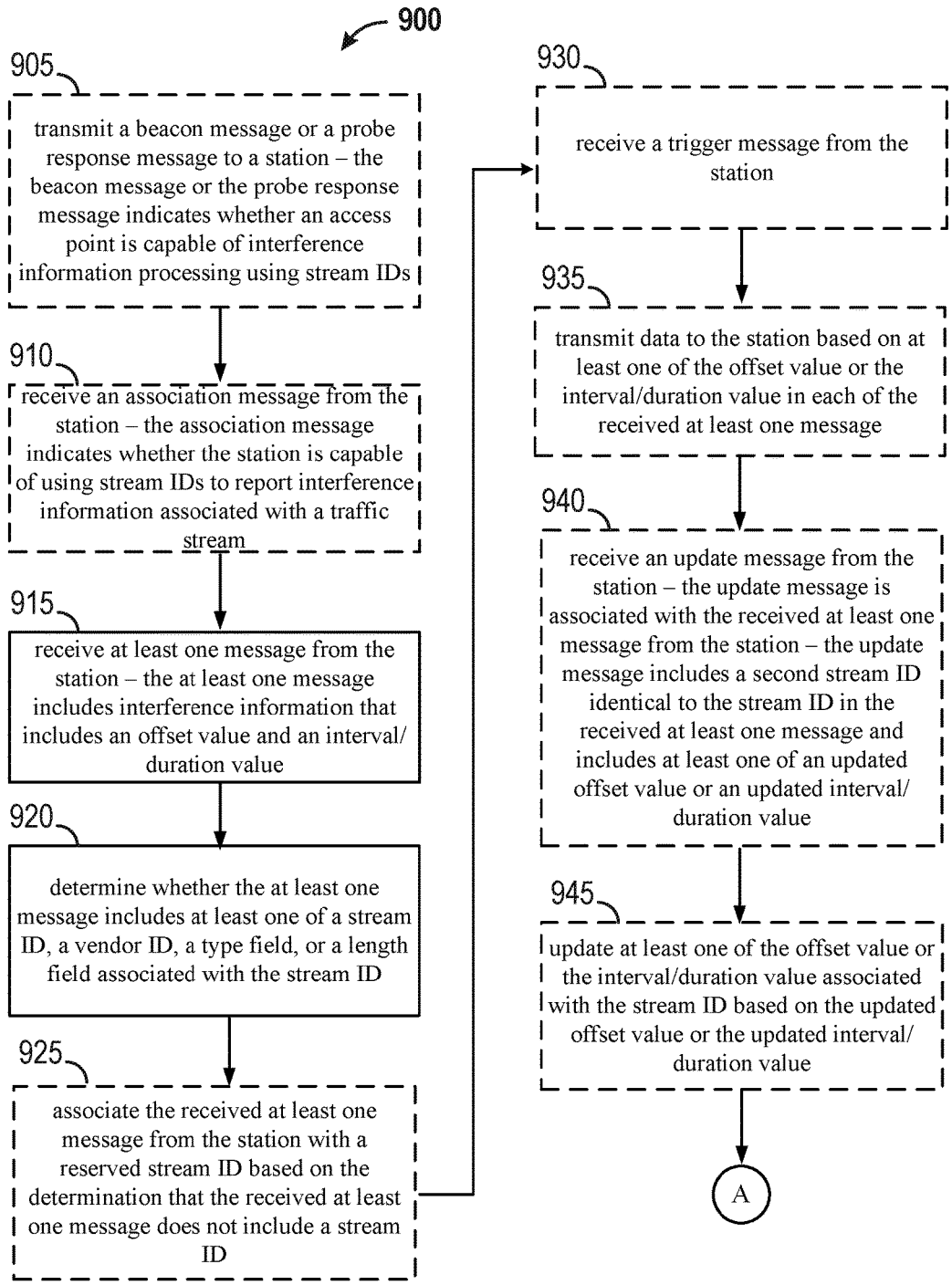
FIGS. 9A and 9B are flowcharts of an example method of wireless communication for supporting AP-assisted multi-way coexistence.
Figure 9B:
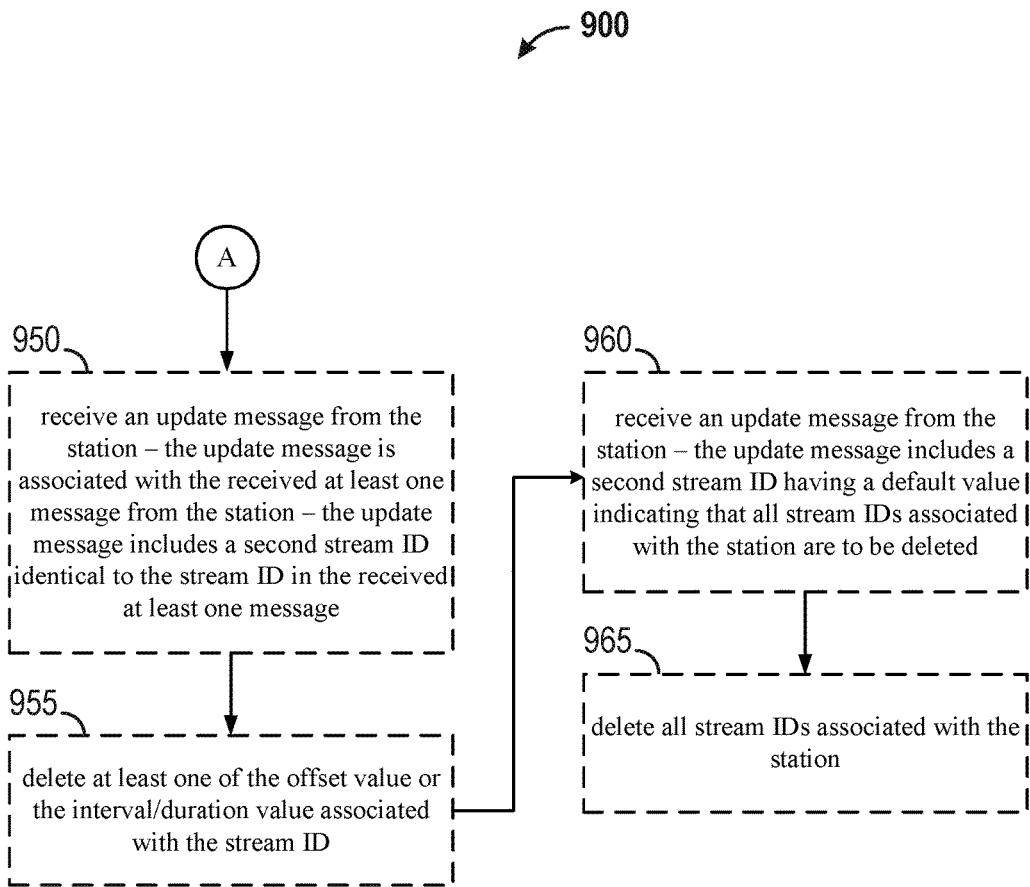

FIGS. 9A and 9B are flowcharts of an example method 900 of wireless communication for supporting AP-assisted multi-way coexistence. The method 900 may be performed using an apparatus (e.g., the AP 104 or the wireless device 802, for example). Although the method 900 is described below with respect to the elements of wireless device 802 of FIG. 8, other components may be used to implement one or more of the steps described herein. Blocks denoted with dotted lines may represent optional operations.

At block 905, the apparatus may transmit a beacon message or a probe response message to the station. The beacon message or the probe response message may indicate whether the apparatus is capable of interference information processing using stream IDs. For example, referring to FIG. 4, the AP 104 may transmit a beacon message to the STA 114. The beacon message may indicate that the AP 104 is capable of interference information processing using stream IDs.

At block 910, the apparatus may receive an association message from the station. The association message may indicate whether the station is capable of using stream IDs to report interference information associated with a traffic stream. For example, referring to FIG. 4, the AP 104 may receive an association message from the STA 114. The association message may indicate that the STA 114 is capable of using stream IDs to report interference information associated with a traffic stream (e.g., the LTE traffic stream).

At block 915, the apparatus may receive at least one message from a station. The at least one message may include interference information that may include an offset value and an interval/duration value. Referring to diagram 450 in FIG. 4, the AP 104 may receive the third and the fourth messages from the STA 114. The third message may include interference information associated with the LTE traffic stream. The interference information may include a third offset value (e.g., 1 ms) and a third interval/duration value (e.g., 5 ms). The fourth message may include interference information associated with the BT A2DP traffic stream. The interference information may include a fourth offset value (e.g., 0) and a fourth interval/duration value (e.g., 2.5 ms).

At block 920, the apparatus may determine whether the at least one message includes at least one of a stream ID, a vendor ID, a type field, or a length field associated with the stream ID. For example, referring to diagram 450 in FIG. 4, the AP 104 may determine that third message includes a stream ID 1. The AP 104 may determine that the fourth message includes a stream ID 0. In another example, the AP 104 may determine that the third message does not include a stream ID.

At block 925, the apparatus may associate the received at least one message from the station with a reserved stream ID based on the determination that the received at least one message does not include a stream ID. For example, referring to FIG. 4, if the AP 104 determines that the third message received from the STA 114 does not include a stream ID, the AP 104 may associate the third message with a reserved stream ID −1.

At block 930, the apparatus may receive a trigger message from the station. For example, referring to FIG. 4, the AP 104 may receive the second trigger message 434 from the STA 114.

At block 935, the apparatus may transmit data to the station based on at least one of the offset value or the interval/duration value in each of the received at least one message. For example, referring to diagram 400 in FIG. 4, the AP 104 may transmit data to the STA 114 based on the offset value and the interval/duration value in each of the first message and the second message. In an aspect, the AP 104 may transmit/schedule a data transmission that satisfies the earliest expected interference at the STA 114 (e.g., based on offset+n*interval) of a mode 1 request or the time duration indicated in a mode 2 request, whichever is earlier in time. In this aspect, n may be a non-negative integer.

At block 940, the apparatus may receive an update message from the station. The update message may be associated with the received at least one message from the station. The update message may include a second stream ID identical to the stream ID in the received at least one message and may include at least one of an updated offset value or an updated interval/duration value. For example, referring to FIG. 4, the AP 104 may receive an updated message from the STA 114. The update message may be associated with the first message received from the STA 114. The update message may include a second stream ID 1, that is identical to the stream ID 1 received in the first message. The update message may include an updated offset value of 2 ms and an updated interval/duration value of 3 ms.

At block 945, the apparatus may update at least one of the offset value or the interval/duration value associated with the stream ID based on the updated offset value or the updated interval/duration value. For example, referring to FIG. 4, the AP 104 may update the offset value (e.g., 1 ms) and the interval/duration value (e.g., 5 ms) associated with the stream ID 1 based on the updated offset value (e.g., 2 ms) and the updated interval/duration value (e.g., 3 ms). In an aspect, instead of an actual value, the update message may include values to with which to adjust the offset value or the interval/duration value.

At block 950, the apparatus may receive an update message from the station. The update message may be associated with the received at least one message from the station. The update message may include a second stream ID identical to the stream ID in the received at least one message. For example, referring to diagram 400 in FIG. 4, the AP 104 may receive an update message from the STA 114. The update message may be associated with the first message from the STA 114. The update message may include a second stream ID 1 identical to the stream ID 1 in the first message.

At block 955, the apparatus may delete at least one of the offset value or the interval/duration value associated with the stream ID. For example, referring to FIG. 4, the AP 104 may delete the offset value and the interval/duration value associated with stream ID 1 of the first message. In an aspect, the AP 104 may also delete the stream ID 1 associated with the STA 114.

At block 960, the apparatus may receive an update message from the station. The update message may include a second stream ID having a default value indicating that all stream IDs associated with the station are to be deleted. For example, referring to FIG. 4, the AP 104 may receive an update message from the STA 114. The update message may include a second stream ID 255, which may be a default value, or reserved value, indicating that all stream IDs associated with the STA 114 are to be deleted.

At block 965, the apparatus may delete all stream IDs associated with the station. For example, referring to FIG. 4, the AP 104 may delete all stream IDs (e.g., stream IDs associated with the first message and the second message) associated with the STA 114. The AP 104 may identify all stream IDs associated with the STA 114 based on the MAC address of the STA 114.

Figure 10:
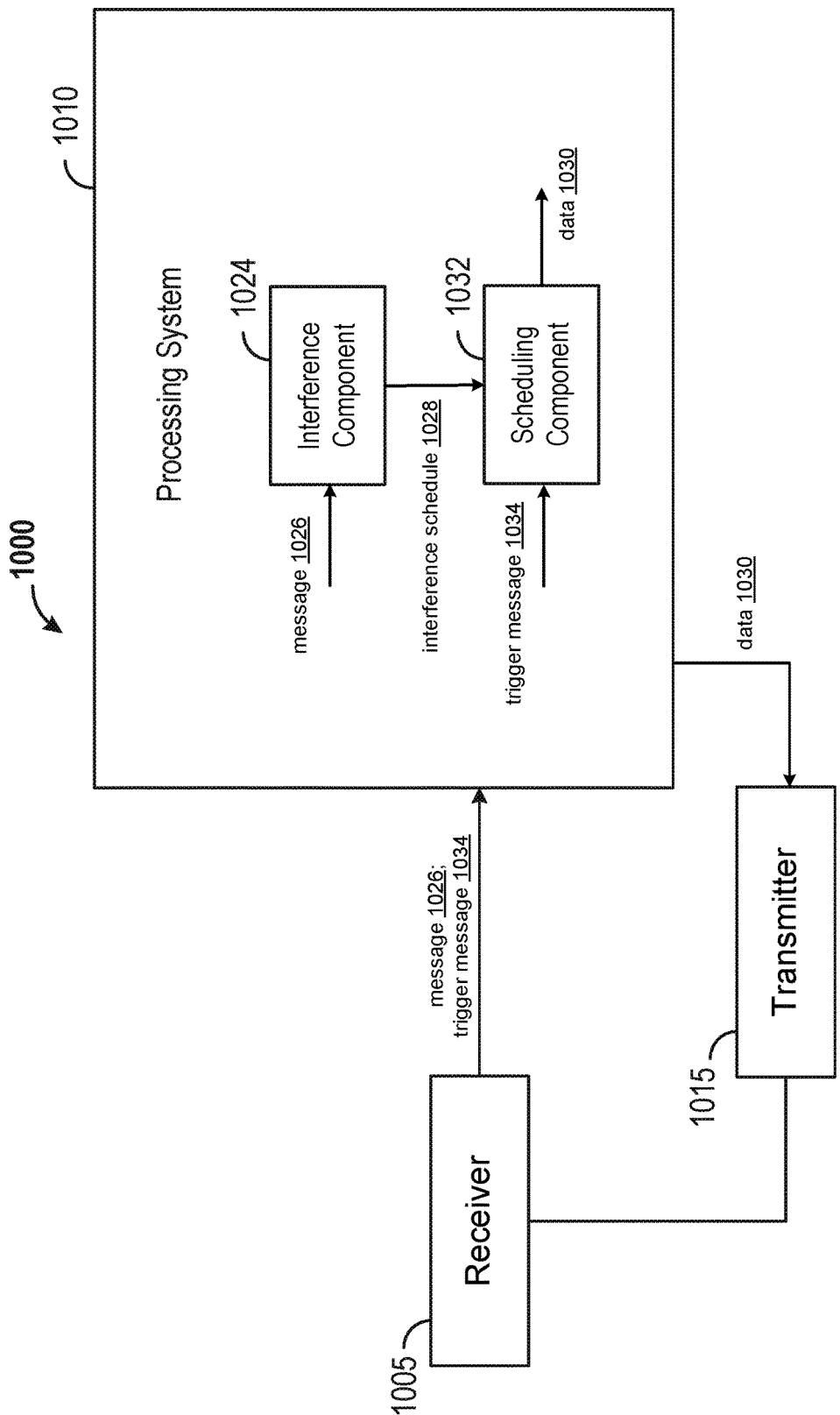
FIG. 10 is a functional block diagram of an example wireless communication device for supporting AP-assisted multi-way coexistence.

FIG. 10 is a functional block diagram of an example wireless communication device 1000 for supporting AP-assisted multi-way coexistence. The wireless communication device 1000 may include a receiver 1005, a processing system 1010, and a transmitter 1015. The processing system 1010 may include an interference component 1024 and/or a scheduling component 1032. The processing system 1010, the interference component 1024, and/or the receiver 1005 may be configured to receive at least one message (e.g., a message 1026) from a station. The at least one message may include interference information that includes an offset value and an interval/duration value. The processing system 1010 and/or the interference component 1024 may be configured to determine whether the at least one message includes at least one of a stream ID, a vendor ID, a type field, or a length field associated with the stream ID. In an aspect, the processing system 1010 and/or the interference component 1024 may be configured to determine an interference schedule 1028 based on the received at least one message and provide the interference schedule 1028 to the scheduling component 1032 to schedule data transmissions to the station based on the interference schedule 1028. The processing system 1010, the interference component 1024, the scheduling component 1032, and/or the receiver 1005 may be configured to receive a trigger message (e.g., a trigger message 1034) from the station. The processing system 1010, the interference component 1024, the scheduling component 1032, and/or the transmitter 1015 may be configured to transmit data (e.g., data 1030) to the station based on at least one of the offset value or the interval/duration value in each of the received at least one message. In an aspect, the processing system 1010, the interference component 1024, the scheduling component 1032, and/or the transmitter 1015 may be configured to transmit data by determining a transmission time window based on the at least one of the offset value or the interval/duration value in each of the received at least one message. The transmission time window may be determined by selecting a transmission time window size that does not overlap with any future interference as determined based on the offset value or the interval/duration value in each of the received at least one message. The processing system 1010, the interference component 1024, and/or the receiver 1005 may be configured to receive an update message from the station. The update message may be associated with the received at least one message from the station. The update message may include a second stream ID identical to the stream ID in the received at least one message and may include at least one of an updated offset value or an updated interval/duration value. The processing system 1010 and the interference component 1024 may be configured to update at least one of the offset value or the interval/duration value associated with the stream ID based on the updated offset value or the updated interval/duration value. The processing system 1010, the interference component 1024, and/or the receiver 1005 may be configured to receive an update message from the station. The update message may be associated with the received at least one message from the station. The update message may include a second stream ID identical to the stream ID in the received at least one message. The processing system 1010 and the interference component 1024 may be configured to delete at least one of the offset value or the interval/duration value associated with the stream ID. The processing system 1010, the interference component 1024, and/or the receiver 1005 may be configured to receive an update message from the station. The update message may include a second stream ID having a default value indicating that all stream IDs associated with the station are to be deleted. The processing system 1010 and the interference component 1024 may be configured to delete all stream IDs associated with the station. The processing system 1010 and the interference component 1024 may be configured to associate the received at least one message from the station with a reserved stream ID based on the determination that the received at least one message does not include a stream ID. The processing system 1010, the interference component 1024, and/or the transmitter 1015 may be configured to transmit a beacon message or a probe response message to the station. The beacon message or the probe response message may indicate whether the wireless communication device 1000 is capable of interference information processing using stream IDs. The processing system 1010, the interference component 1024, and/or the receiver 1005 may be configured to receive an association message from the station. The association message may indicate whether the station is capable of using stream IDs to report interference information associated with a traffic stream.

The receiver 1005, the processing system 1010, the interference component 1024, and/or the transmitter 1015 may be configured to perform one or more functions discussed above with respect to blocks 905, 910, 915, 920, 925, 930, 935, 940, 945, 950, 955, 960, and 965 of FIGS. 9A and 9B. The receiver 1005 may correspond to the receiver 812. The processing system 1010 may correspond to the processor 804. The transmitter 1015 may correspond to the transmitter 810. The interference component 1024 may correspond to the interference component 124 and/or the interference component 824.

In one configuration, the wireless communication device 1000 may include means for receiving at least one message from a station, and the at least one message may include interference information that may include an offset value and an interval/duration value. The wireless communication device 1000 may include mean for determining whether the at least one message includes at least one of a stream ID, a vendor ID, a type field, or a length field associated with the stream ID. In another configuration, the wireless communication device 1000 may include means for receiving a trigger message from the station and means for transmitting data to the station based on at least one of the offset value or the interval/duration value in each of the received at least one message. In one configuration, the means for transmitting the data to the station may be configured to determine a transmission time window based on the at least one of the offset value or the interval/duration value in each of the received at least one message. In this configuration, the means for determining may be configured to determine the transmission time window by selecting a transmission time window size that does not overlap with any future interference as determined based on the offset value or the interval/duration value in each of the received at least one message. In another configuration, the wireless communication device 1000 may include means for receiving an update message from the station. The update message may be associated with the received at least one message from the station, and the update message may include a second stream ID identical to the stream ID in the received at least one message and includes at least one of an updated offset value or an updated interval/duration value. In this configuration, the wireless communication device 1000 may include means for updating at least one of the offset value or the interval/duration value associated with the stream ID based on the updated offset value or the updated interval/duration value. In another configuration, the wireless communication device 1000 may include means for receiving an update message from the station, and the update message may be associated with the received at least one message from the station. The update message may include a second stream ID identical to the stream ID in the received at least one message. In this configuration, the wireless communication device 1000 may include means for deleting at least one of the offset value or the interval/duration value associated with the stream ID. In another configuration, the wireless communication device 1000 may include means for receiving an update message from the station. The update message may include a second stream ID having a default value indicating that all stream IDs associated with the station are to be deleted. In this configuration, the wireless communication device 1000 may include means for deleting all stream IDs associated with the station. In another configuration, the wireless communication device 1000 may include means for associating the received at least one message from the station with a reserved stream ID based on the determination that the received at least one message does not include a stream ID. In another configuration, the wireless communication device 1000 may include means for transmitting a beacon message or a probe response message to the station, and the beacon message or the probe response message may indicate whether the access point is capable of interference information processing using stream IDs. In another configuration, the wireless communication device 1000 may include means for receiving an association message from the station, and the association message may indicate whether the station is capable of using stream IDs to report interference information associated with a traffic stream.

For example, means for receiving may include the processing system 1010, the interference component 1024, and/or the receiver 1005. Means for determining whether the at least one message includes at least one of a stream ID may include the processing system 1010 and/or the interference component 1024. Means for transmitting may include the processing system 1010, the interference component 1024, and/or the transmitter 1015. Means for updating may include the processing system 1010 and/or the interference component 1024. Means for deleting may include the processing system 1010 and/or the interference component 1024. Means for associating may include the processing system 1010 and/or the interference component 1024.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, components and circuits described in connection with the present disclosure may be implemented or performed with a general purpose processor, a DSP, an ASIC, an FPGA or other PLD, discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, compact disc (CD) ROM (CD-ROM) or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, digital versatile disc (DVD), floppy disk and blu-ray disc where disks usually reproduce data magnetically, while discs reproduce data optically with lasers. Thus, computer readable medium comprises a non-transitory computer readable medium (e.g., tangible media).

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Further, it should be appreciated that components and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for."

What is claimed is:

1. A method of wireless communication by a station, comprising:
   determining interference information associated with interference windows of at least one traffic stream, the interference information comprising a non-zero offset value indicative that the interference windows are periodic or a zero offset value indicative that the interference windows are non-periodic; and
   transmitting a message including the interference information to an access point, wherein the message includes a stream identifier (ID) associated with both the interference information and the at least one traffic stream.

2. The method of claim 1, wherein the interference information further comprises an interval/duration value indicative of:
   a time interval between the interferences windows when the interference information comprises the non-zero offset value; or
   a time duration corresponding to when the access point is allowed to transmit data to the station when the interference information comprises the zero offset value.

3. The method of claim 2, further comprising:
   transmitting an update message to the access point, wherein the update message is associated with the message, wherein the update message includes the stream ID and at least one of a second offset value or a second interval/duration value, and wherein the second offset value or the second interval/duration value is associated with updated interference information related to the at least one traffic stream.

4. The method of claim 2, further comprising:
   transmitting an update message to the access point, wherein the update message is associated with the message, wherein the update message includes the stream ID and indicates that the interference information associated with the stream ID is to be deleted.

5. The method of claim 2, wherein the at least one traffic stream includes at least two non-periodic traffic streams, the method further comprising:
   determining the interval/duration value based on the at least two non-periodic traffic streams, wherein the stream ID is associated with the at least two non-periodic traffic streams.

6. The method of claim 1, wherein the stream ID is indicative that the interference windows of the at least one traffic stream are non-periodic traffic.

7. The method of claim 1, wherein the stream ID is a reserved value indicative that all stream IDs associated with the station are to be deleted.

8. The method of claim 1, further comprising:
   receiving a beacon message or a probe response message from the access point, wherein the beacon message or the probe response message includes information indicative of whether the access point is configured to perform interference information processing using stream IDs; and
   determining whether the access point is configured to perform interference information processing using stream IDs based on the information in the beacon message or the probe response message.

9. The method of claim 8, further comprising:
   transmitting an association message to the access point, wherein the association message indicates whether the station is configured to use stream IDs to report interference information associated with a traffic stream.

10. The method of claim 1, further comprising:
    transmitting a trigger message to the access point during a time period in which interference associated with the station is not present.

11. An apparatus for wireless communication, comprising:
    a memory; and
    at least one processor coupled to the memory, wherein the at least one processor is configured to:
       determine interference information associated with interference windows of at least one traffic stream, the interference information comprising a non-zero offset value indicative that the interference windows are periodic or a zero offset value indicative that the interference windows are non-periodic; and
       transmit a message including the interference information to an access point, wherein the message includes a stream identifier (ID) associated with both the interference information and the at least one traffic stream.

12. The apparatus of claim 11, wherein the interference information further comprises an interval/duration value indicative of:
    a time interval between the interferences windows when the interference information comprises the non-zero offset value; or
    a time duration corresponding to when the access point is allowed to transmit data to the apparatus when the interference information comprises the zero offset value.

13. The apparatus of claim 12, wherein the at least one processor is further configured to:
    transmit an update message to the access point, wherein the update message is associated with the message, wherein the update message includes the stream ID and at least one of a second offset value or a second interval/duration value, and wherein the second offset value or the second interval/duration value is associated with updated interference information related to the at least one traffic stream.

14. The apparatus of claim 12, wherein the at least one processor is further configured to:
    transmit an update message to the access point, wherein the update message is associated with the message, wherein the update message includes the stream ID and indicates that the interference information associated with the stream ID is to be deleted.

15. The apparatus of claim 12, wherein the at least one traffic stream includes at least two non-periodic traffic streams, wherein the at least one processor is further configured to:
  determine the interval/duration value based on the at least two non-periodic traffic streams, wherein the stream ID is associated with the at least two non-periodic traffic streams.

16. The apparatus of claim 11, wherein the at least one processor is further configured to:
  receive a beacon message or a probe response message from the access point, wherein the beacon message or the probe response message includes information indicative of whether the access point is configured to perform interference information processing using stream IDs; and
  determine whether the access point is configured to perform interference information processing using stream IDs based on the information in the beacon message or the probe response message.

17. The apparatus of claim 16, wherein the at least one processor is further configured to:
  transmit an association message to the access point, wherein the association message indicates whether the apparatus is configured to use stream IDs to report interference information associated with a traffic stream.

18. A method of wireless communication by an access point, comprising:
  receiving at least one message from a station, wherein the at least one message includes interference information comprising a non-zero offset value indicative that interference windows associated with at least one traffic stream are periodic or a zero offset value indicative that the interference windows are non-periodic;
  determining a transmission time window based on the non-zero offset value or the zero offset value in each of the received at least one message; and
  transmitting data to the station within the transmission time window.

19. The method of claim 18, further comprising:
  receiving a trigger message from the station; and
  transmitting the data to the station based on the trigger message.

20. The method of claim 18, wherein the interference information further comprises an interval/duration value indicative of: a time interval between the interferences windows when the interference information comprises the non-zero offset value; or a time duration corresponding to when the access point is allowed to transmit data to the station when the interference information comprises the zero offset value, and wherein the method further comprises:
  determining the transmission time window based on the interval/duration value in each of the received at least one message.

21. The method of claim 20, wherein the determining the transmission time window comprises selecting a transmission time window size that does not overlap with any future interference as determined based on the non-zero offset value, the zero offset value, or the interval/duration value in each of the received at least one message.

22. The method of claim 20, further comprising:
  receiving an update message from the station, wherein the update message is associated with the received at least one message from the station, wherein the update message includes a second stream ID identical to a stream ID in the received at least one message and includes at least one of an updated offset value or an updated interval/duration value; and
  updating at least one of the non-zero offset value, the zero offset value, or the interval/duration value associated with the stream ID based on the updated offset value or the updated interval/duration value.

23. The method of claim 20, further comprising:
  receiving an update message from the station, wherein the update message is associated with the received at least one message from the station, wherein the update message includes a second stream ID identical to a stream ID in the received at least one message; and
  deleting at least one of the non-zero offset value, the zero offset value, or the interval/duration value associated with the stream ID.

24. The method of claim 18, further comprising:
  receiving an update message from the station, wherein the update message includes a stream ID having a default value indicating that all stream IDs associated with the station are to be deleted; and
  deleting all stream IDs associated with the station.

25. The method of claim 18, further comprising:
  determining that the received at least one message does not include a stream ID; and
  associating the received at least one message from the station with a reserved stream ID based on the determination that the received at least one message does not include a stream ID.

26. The method of claim 18, further comprising:
  transmitting a beacon message or a probe response message to the station, wherein the beacon message or the probe response message indicates whether the access point is configured to perform interference information processing using stream IDs.

27. The method of claim 18, further comprising:
  receiving an association message from the station, wherein the association message indicates whether the station is configured to use stream IDs to report interference information associated with a traffic stream.

28. An apparatus for wireless communication, comprising:
  a memory; and
  at least one processor coupled to the memory, wherein the at least one processor is configured to:
    receive at least one message from a station, wherein the at least one message includes interference information comprising a non-zero offset value indicative that interference windows associated with at least one traffic stream are periodic or a zero offset value indicative that the interference windows are non-periodic;
    determine a transmission time window based on the non-zero offset value or the zero offset value in each of the received at least one message; and
    transmit data to the station within the transmission time window.

29. The apparatus of claim 28, wherein the at least one processor is further configured to:
  receive a trigger message from the station; and
  transmit the data to the station based on the trigger message.

30. The apparatus of claim 28, wherein the at least one processor is further configured to:
  receive an update message from the station, wherein the update message is associated with the received at least one message from the station, wherein the update message includes a second stream ID identical to a stream ID in the received at least one message and includes an updated offset; and update at least one of the non-zero offset value or the zero offset value associated with the stream ID based on the updated offset value.

* * * * *